US011461314B2

(12) United States Patent
Mitra

(10) Patent No.: US 11,461,314 B2
(45) Date of Patent: Oct. 4, 2022

(54) TECHNIQUES FOR GENERATING A BOOLEAN SWITCH INTERFACE FOR LOGICAL SEARCH QUERIES

(71) Applicant: Oracle International Corporation, Redwood Shores, CA (US)

(72) Inventor: Debajyoti Mitra, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/097,872

(22) Filed: Nov. 13, 2020

(65) Prior Publication Data

US 2022/0156256 A1 May 19, 2022

(51) Int. Cl.
*G06F 16/242* (2019.01)
*G06F 3/04847* (2022.01)
*G06F 3/0482* (2013.01)

(52) U.S. Cl.
CPC ........ *G06F 16/2428* (2019.01); *G06F 3/0482* (2013.01); *G06F 3/04847* (2013.01)

(58) Field of Classification Search
CPC . G06F 16/2428; G06F 3/04847; G06F 3/0482
See application file for complete search history.

(56) References Cited

U.S. PATENT DOCUMENTS

| | | | |
|---|---|---|---|
| 5,913,215 A * | 6/1999 | Rubinstein ............ | G06F 16/951 707/708 |
| 6,768,997 B2 | 7/2004 | Schirmer et al. | |
| 7,444,348 B2 | 10/2008 | Fries et al. | |
| 8,543,936 B2 * | 9/2013 | Neale ................. | G06F 16/332 715/780 |
| 2002/0078016 A1 * | 6/2002 | Lium .................. | G06F 16/954 |
| 2005/0183025 A1 * | 8/2005 | Kumar ............... | G06N 5/025 715/764 |
| 2005/0187925 A1 * | 8/2005 | Schechinger ...... | G06Q 30/0601 |
| 2008/0288869 A1 | 11/2008 | Ubillos | |

(Continued)

OTHER PUBLICATIONS

Best UX Practice for a OR/AND Search Box, Available Online at: https://ux.stackexchange.com/questions/114726/whats-best-ux-practice-for-a-or-and-search-box, Accessed from internet on Nov. 18, 2020, 4 pages.

(Continued)

*Primary Examiner* — Michael Roswell
(74) *Attorney, Agent, or Firm* — Kilpatrick Townsend & Stockton LLP

(57) ABSTRACT

A computing system may receive a first user input providing an indication for a search of stored data. The system may generate a list of search criteria in a first graphical user interface. The system may receive a first selection of one or more search criteria from the list of search criteria. The system may generate a selected search criteria interface in a second graphical user interface comprising a graphical Boolean switch between each of adjoining search criteria. The system may receive a second user input for setting the graphical Boolean switch. The system may generate a first logical expression for a search based at least in part on the selected search criteria and positions of a plurality of graphical Boolean switches between the selected search criteria. The system may generate a search result of the stored data based at least in part on the first logical expression.

20 Claims, 20 Drawing Sheets

(56) References Cited

U.S. PATENT DOCUMENTS

2010/0076952 A1* 3/2010 Wang .................... G06F 16/951
                                                      707/706
2012/0254219 A1  10/2012 Bell
2017/0091325 A1*  3/2017 Berentsen ......... G06F 16/24578

OTHER PUBLICATIONS

How to Search in Brain space 6, Lighthouse, Version 1.0, Available Online at: https://lighthouseglobal.com/wp-content/uploads/2018/08/How-to-search-in-Brainspace-6.pdf, 7 pages.

JQuery Query Builder, jQuery Plugin for User Friendly Query/Filter Creator, Available Online at: https://querybuilder.js.org/, Accessed from internet on Nov. 18, 2020, 17 pages.

Switch or Toggle a Boolean Value, Out systems, Available Online at: https://success.outsystems.com/@api/deki/pages/20497/pdf/Switch%2bor%2bToggle%2ba%2bBoolean%2bValue.pdf?stylesheet=default, Nov. 18, 2020, 3 pages.

The React Query Builder UI Component, Syncfustion, Available Online at: https://www.syncfusion.com/react-ui-components/react-query-builder. Accessed from internet on Nov. 18, 2020, 7 pages.

Jones et al., A Graphical User Interface for Boolean Query Specification, Working Paper Series, ISSN 1170-487X, Department of Computer Science, The University of Waikato, Dec. 1997, 19 pages.

\* cited by examiner

Search and Compare Profiles

Step 1/3
Search Criteria and Filters

Previous | Next

Your search criteria (0) — 402

GROUP - DEFAULT

Cancel  Add / Remove Criteria  Done — 404, 418

Type: Competencies    Name or ID: Optional

Search Criteria

⊕ Analytical thinking
  Compentency / 0101 — 406

⊕ Bachelor of Business Admin
  Compentency / BBA — 406

⊕ Bachelor of Engineering
  Compentency / BE — 406

⊕ Collaborates on projects
  Compentency / 0158 — 406

⊕ English — 408
  Compentency / EN — 406

⊕ Manage and motivate team
  Compentency / HOPRES01 — 406

⊕ Master of Science
  Compentency / MS — 406

⊕ Mental flexibility
  Compentency / 0103 — 406

⊕ Resource Planning — 406

⊖ 2 Competencies 2 Total    Show all selected — 412

A B C D E F G H I J K L M N O P Q R S T U V W X Y Z # — 416

Add Group

Remove Criteria

FIG. 4

| Non-Profile Info | 100% MATCH Christelle Stevenson Details > | 94% MATCH Cynthia Adams Details > | 91% MATCH Edmund Donahue Details > |
|---|---|---|---|
| Business Unit | GBIBU | GBIBU | CAN01 |
| Company | Global Business Institute | Global Business Institute | - |
| Current Annual Salary | - | - | - |
| Current Performance Rating | - | 5 | 8 |
| Department | Finance and Admin | Corporate Accounting | - |
| Full/Part Time | Full Time | Full Time | Full Time |
| Job Interests | - | - | - |
| Location | Redwood City, CA | Pleasanton, CA 94588 | - |
| Regular/Temporary | Regular | Regular | Regular |
| Regulatory Region | United States | United states | Canada |
| Salary Admin Plan | - | - | - |
| Salary grade | - | - | - |

FIG. 11

FIG. 12

FIG. 13

TECHNIQUES FOR GENERATING A BOOLEAN SWITCH INTERFACE FOR LOGICAL SEARCH QUERIES

BACKGROUND

Users often must enter multiple search criteria to perform a complex search. Multiple search criteria can be joined using a logical expression that describes how the criteria are connected. Logical expression languages can be ambiguous and/or technical, which may impede an extent to which a user can generate logical expressions that accord with a desired type of search.to the user.

Implementing a search using a logical expression that does not match a desired type of search can result in an over-inclusive or under-inclusive set of search results. The search industry has tried different approaches to solve these problems, but previous solutions generally remain unintuitive to a novice user. Some of the solutions include interfaces that impose drastic constraints on the types of queries that may be performed (to facilitate interface simplicity). Some of the solutions include increased direction or instruction to identify how the interface is to be used (e.g., while still requiring many user inputs to create an expression). Some of the solutions include using multiple drop-down menus (which may be problematic in terms of concurrent visualization of the selections on small screens, such as mobile-device screens).

None of the previous solutions provide a simple interface that allows a user to easily create complex search queries and to easily comprehend the logical commands of the expression that is in the midst of being created.

SUMMARY

Techniques described herein provide a solution for creating a logical expression for a search. The techniques provide an intuitive user interface to allow a user to create and modify logical expressions without requiring that a user have any experience with creating logical expressions. The user interface allows for selecting various search criteria, search criteria modifiers, and secondary search criteria. The search criteria can be joined using logical expressions (e.g., "AND" or "OR"), which can determine the relationship between the search criteria for returning search results. The logical expressions can be represented by a graphical Boolean switch. The graphical Boolean switch can be called a Boolean Switch because it uses two of the Boolean Logic Operators "OR," "AND," "NOT," and "XOR" from Boolean Algebra. The graphical Boolean switches can be modified using a single click or tap on the graphical Boolean switch in the user interface. The user can even reorder or re-arrange the search criteria by simply dragging and dropping the expressions within the user interface. The user interface can further enable connecting various search criteria to facilitate user-defined creation of multiple groups of search criteria to generate more complex search criteria.

In one non-limiting example, a network manager can be troubleshooting technical problems within a cloud-based computer network. The network manager can create a logical expression of various fault codes or error messages in order to perform a search on the network error logs to discover the potential cause of the problem. The "OR" logical operator can connect various error messages or fault codes which can produce the same or similar technical problems. For example, hardware failure or power failure may produce similar results. Therefore, by searching for both types of error messages and fault codes will not overlook a potential cause of the problem. The "AND" logical operator can connect various error message and fault codes that may not produce the same or similar technical results. For example, malware may produce very difficult results than overheating equipment.

According to some implementations, a method may include receiving a first user input, the first user input providing an indication for a search of stored data. The method can include generating a list of search criteria in a first graphical user interface. The method can include receiving a first selection of one or more search criteria from the list of search criteria. The method can include generating a selected search criteria interface in a second graphical user interface. The selected search criteria can include graphical Boolean switch between each of adjoining search criteria in the selected search criteria interface. The method can include receiving a second user input for setting the graphical Boolean switch. The method can include generating a first logical expression for a search based at least in part on the selected search criteria and positions of a plurality of graphical Boolean switches between the selected search criteria. The method can include generating a search result of the stored data based at least in part on the first logical expression.

According to some implementations, a server may include one or more memories; and one or more processors, communicatively coupled to the one or more memories, configured perform operations to receive a first user input. The first user input can provide an indication for a search of stored data. The operations can include generating a list of search criteria in a first graphical user interface. The operations can include receiving a first selection of one or more search criteria from the list of search criteria. The operations can include generating a selected search criteria interface in a second graphical user interface. The selected search criteria can include graphical Boolean switch between each of adjoining search criteria in the selected search criteria interface. The operations can include receiving a second user input for setting the graphical Boolean switch. The operations can include generating a first logical expression for a search based at least in part on the selected search criteria and positions of a plurality of graphical Boolean switches between the selected search criteria. The operations can include generating a search result of the stored data based at least in part on the first logical expression.

According to some implementations, a non-transitory computer-readable medium may store one or more instructions. The one or more instructions, when executed by one or more processors of a server, may cause the one or more processors to perform operations. The operations can include receiving a first user input. The first user input providing an indication for a search of stored data. The operations can include generating a list of search criteria in a first graphical user interface. The operations can include receiving a first selection of one or more search criteria from the list of search criteria. The operations can include generating a selected search criteria interface in a second graphical user interface, The selected search criteria can include graphical Boolean switch between each of adjoining search criteria in the selected search criteria interface. The operations can include receiving a second user input for setting the graphical Boolean switch. The operations can include generating a first logical expression for a search based at least in part on the selected search criteria and positions of a plurality of graphical Boolean switches between the selected search criteria. The operations can include generating a search result of the stored data based at least in part on the first logical expression.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

BRIEF DESCRIPTION OF THE DRAWINGS

The specification makes reference to the following appended figures, in which use of like reference numerals in different figures is intended to illustrate like or analogous components.

FIG. 4 illustrates an exemplary graphical user interface for selecting search criteria.

FIG. 11 illustrates an exemplary comparison of search results.

FIG. 12 illustrates an exemplary list of search results.

FIG. 13 illustrates an exemplary comparison of search results.

DETAILED DESCRIPTION

Figure 1:
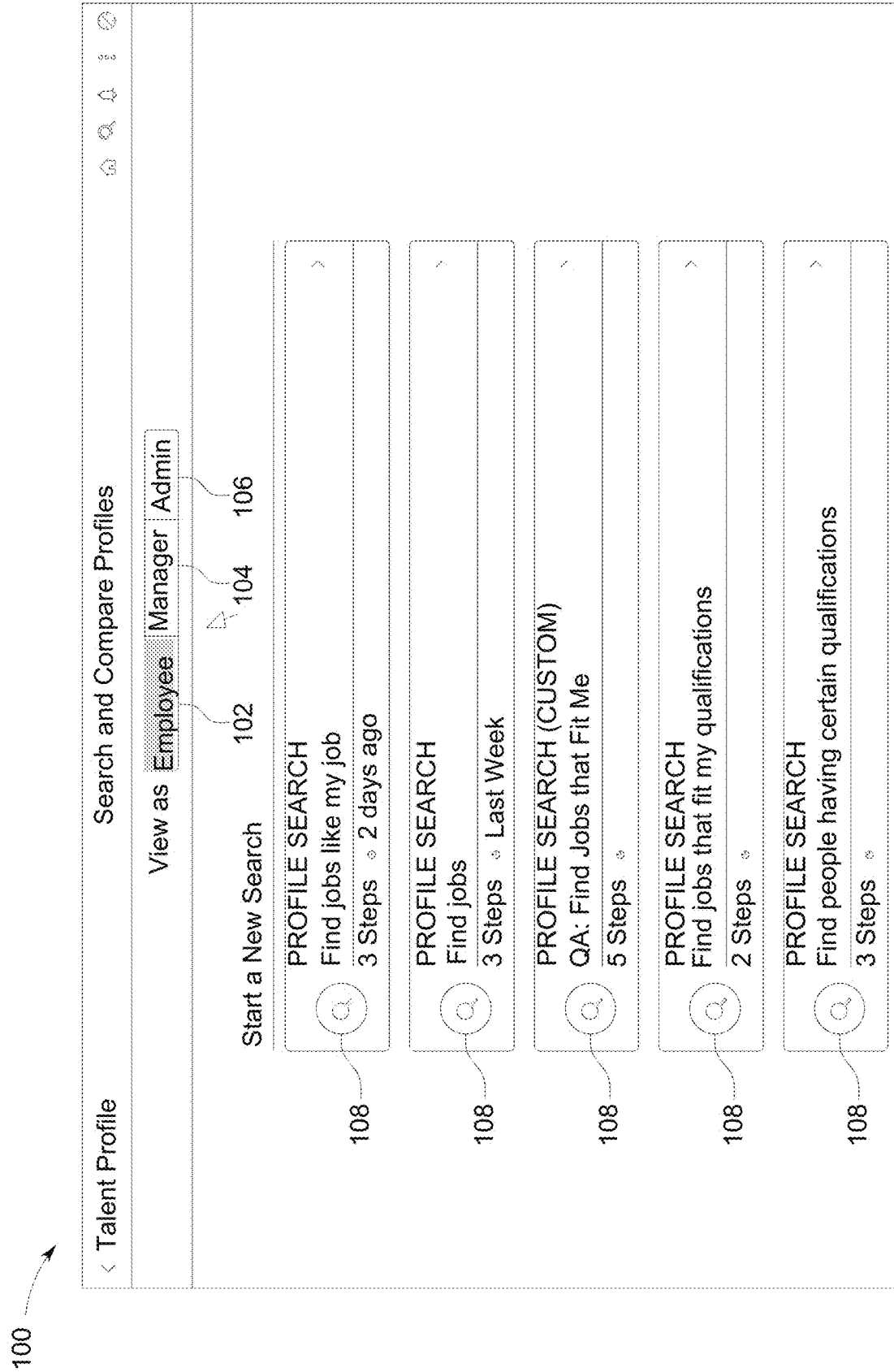
FIG. 1 illustrates an exemplary user interface for initiating a search of stored data.

The following detailed description of example implementations refers to the accompanying drawings. The same reference numbers in different drawings may identify the same or similar elements.

Techniques described herein provide a solution for creating a logical expression for a search. The techniques provide an intuitive user interface to allow a user to create and modify logical expressions despite having minimal, suboptimal or no experience with creating logical expressions. The user interface allows for selecting various search criteria, search criteria modifiers, and/or secondary search criteria. The search criteria can be joined using logical expressions (e.g., "AND" or "OR"), which can define the relationship between the search criteria for returning search results. The logical expressions can be represented by a graphical Boolean switch. The graphical Boolean switch can be called a Boolean Switch, so as to indicate that it uses two of the Boolean Logic Operators of "OR," "AND," "NOT," "XOR" from Boolean Algebra. The graphical Boolean switches can be changed from "AND" to "OR" using a single click or tap on the graphical Boolean switch in the user interface allowing the user to quickly connect the search criteria to generate the logical expression.

The user can add several search criteria from a library of stored search criteria by selecting the search criteria from a list. As the search criteria are added to the list, the search criteria terms may not be grouped such that alternate search terms are grouped adjacent to each other. For example, using the above network-troubleshooting example, the user may want to search various error messages or fault codes, which can produce the same or similar technical problems. The user would select these error messages or fault codes from a search criteria list. The user may want to join these search criteria together using an "OR" logical operator, however the search criteria may not initially appear next to each other as they are selected from the search criteria list.

The user can re-arrange the search criteria by simply dragging and dropping the expressions within the user interface. This allows various search criteria to be connected to each other using the "OR" logical operator. By connecting the various search criteria together using the "OR" logical operator, the user can create multiple groups of search criteria to generate more complex search criteria.

A search routine can use the logical expression to search a plurality of data records to return search results. Each search result can correspond to a record that meets the search criteria defined in the logical expression. The logical expression can include one or more primary search criteria connected via "AND" or "OR" logical connectors. If search criteria items are connected using an "AND" logical operator, then the search routine will search for record results that meet all of the value constraints specified in the primary search criteria connected by the "AND" operator. If search criteria items are connected using an "OR" logical connector, then the search routine will search for record results that meet the value constraint specified in at least one of the primary search criteria connected by the "OR" operator. If the logical expression includes both one or more "AND" operators and one or more "OR" operators, the search routine will return records that include at least one of the primary search criteria for each of the primary search criteria connected using "OR" operators and meet all of the primary search criteria for search criteria connected by the "AND" operators.

Following an initial search that implements the primary search criteria, each result can be assigned a score. The score can be generated by averaging one or more sub-scores for each of the primary search criterion in the logical expression. For example, for a logical expression of (Criterion A OR Criterion B) AND Criterion C, each of Criterion A, Criterion B, and Criterion C can be assigned a sub-score, and the score can be determined using the sub-scores. For primary search criterion connected by the "OR" logical operator, the highest of the sub-scores can be used for calculating a score for the entire expression. For example, if the sub-score for Criterion A is 100 and the sub-score for Criterion B is zero, the sub-score for the logical expression (Criterion A OR Criterion B) would be 100. The score for the logical expression (Criterion A OR Criterion B) AND Criteria C can be the average of (the highest score for Criterion A and Criterion B) AND the sub-score for Criterion C.

For primary search criteria without secondary, the sub-score can be binary. A value of zero can indicate—with respect to a given record—the primary search criteria was not satisfied, and a score of 1001 (or 1) can indicate that the primary search criteria was satisfied.

For primary search criteria with secondary search criteria values, the sub-score can be a real number along a pre-defined range. For example, a sub-score of zero can indicate that none of the secondary search criteria were satisfied; a sub-score of 100 can indicate that all of the secondary search criteria were satisfied; and a sub-score greater than 0 and less than 100 can indicate that an incomplete set of the secondary search criteria were satisfied.

When a secondary search criteria indicates that the secondary search criteria is designated to be mandatory, the data record values must meet all primary and secondary search criteria value constraints specified by the user. When the mandatory designation is not made, then the score is defined to be positively correlated with the quantity of value constrains from the secondary search criteria that are satisfied. The system can use a Closest Fit scoring method for all search types to rank the target data records to the search criteria specified for the logical expression. This means the profiles closest to the search criteria will be ranked higher. Items with the same rating score can be identified at a 100 percent match while target profile items with a lower or higher rating can be assigned a score of less than 100 percent.

Each data record can be assigned a score for the entire logical expression by averaging the sub-scores for each of the primary search criteria connected by "AND" logical operators. The search results can include the highest scoring records for the entire logical expression (e.g., a predefined number of records that are associated with scores higher than other records or each record associated with a score above a predetermined threshold). A representation of each search result can be displayed, potentially in visual association with a corresponding score.

Techniques disclosed herein have multiple technical advantages. For example, techniques facilitate generation of complex compound search queries that operate in accordance with a target search. More specifically, particular interfaces are configured to use spatial proximity and interactive Boolean switches to control and convey Boolean operations that are to be implemented in a search. This interface improves the likelihood that a conducted search will be performed in accordance with initial objectives, even if a user interacting with the interface to specify search criteria have minimal, sub-optimal or no experience with creating logical expressions. The techniques also allow a user to readily identify the logical operators in the logical expression in an intuitive way. Finally, the techniques generate a user interface that, even if used on a small screen (e.g., of a mobile device), provide compact presentation of multiple search queries and Boolean connector so as to still allow a logical expression to be generated with multiple search criteria despite the limited screen area.

FIG. 1 illustrates an exemplary user interface 100 for initiating a search of stored data. The exemplary user interface 100 can provide several different views. For example, the user interface 100 can provide a first view 102, a second view 104, and a third view 106. A user can select any one of these different views. Selecting one of these views can provide a view from a given perspective of a user. In a non-limiting example, the views can be an employee view, a manager view, and an administrator view. Each of the different views can allow for the selection of different search criteria for a list of stored search criteria. In various embodiments of the first view 102, the user interface 100 can receive a user input for several different profile searches 108. The profile search 108 can include titles that relate to different types of searches. For example, the titles can include "Why is network connectivity slow?", "Why are network nodes unavailable?", and "Identify potential malware issues." When a user selects one of the different profile searches 108, the technique can identify a list of various search criteria related to the profile search 108 that a user can select. For example, if the user selected "Why are network nodes unavailable?" the system can provide search criteria such as fault codes or error messages related to network node availability. Other profile searches 108 may be performed using the techniques described herein. While the profile searches 108 illustrated in FIG. 1 focus on employment-type searches, the techniques described herein are not so limited.

Figure 2:
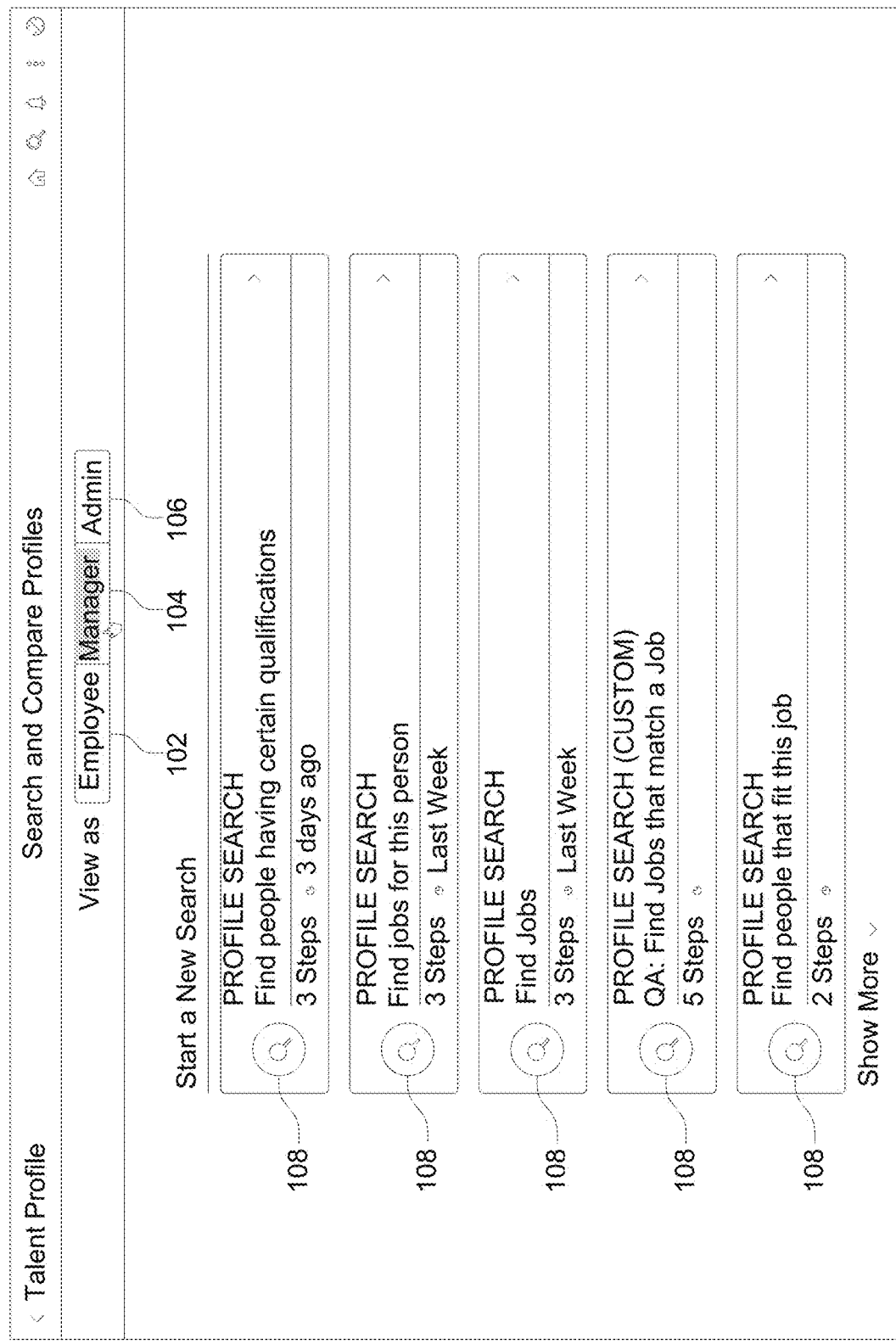
FIG. 2 illustrates an exemplary user interface for initiating a search of stored data.

FIG. 2 illustrates an exemplary user interface 200 for initiating a search of stored data. FIG. 2 illustrates a second view 104. In various non-limiting examples, the second view 104 can be a manager view 104. In the second view 104, the user interface 200 can receive a user input for several different profile searches 108. The profile searches for the second view 104 can be from a different perspective than shown for the first view 102 described in FIG. 1. For example, the profile searches 108 illustrated in FIG. 2 may be related from a different perspective such as a network center administrator as opposed to a local network administrator. The profile search 108 can include titles that relate to different types of searches. For example, the profile search 108 titles can include "Why is network traffic in a region slow?", "Why are resources in a region unavailable?", "Find similarities in fault codes between different regions." Other profile searches 108 may be performed using the techniques described herein. While the profile searches 108 illustrated in FIG. 2 focus on searches for employees, the techniques described herein are not so limited.

Figure 3:
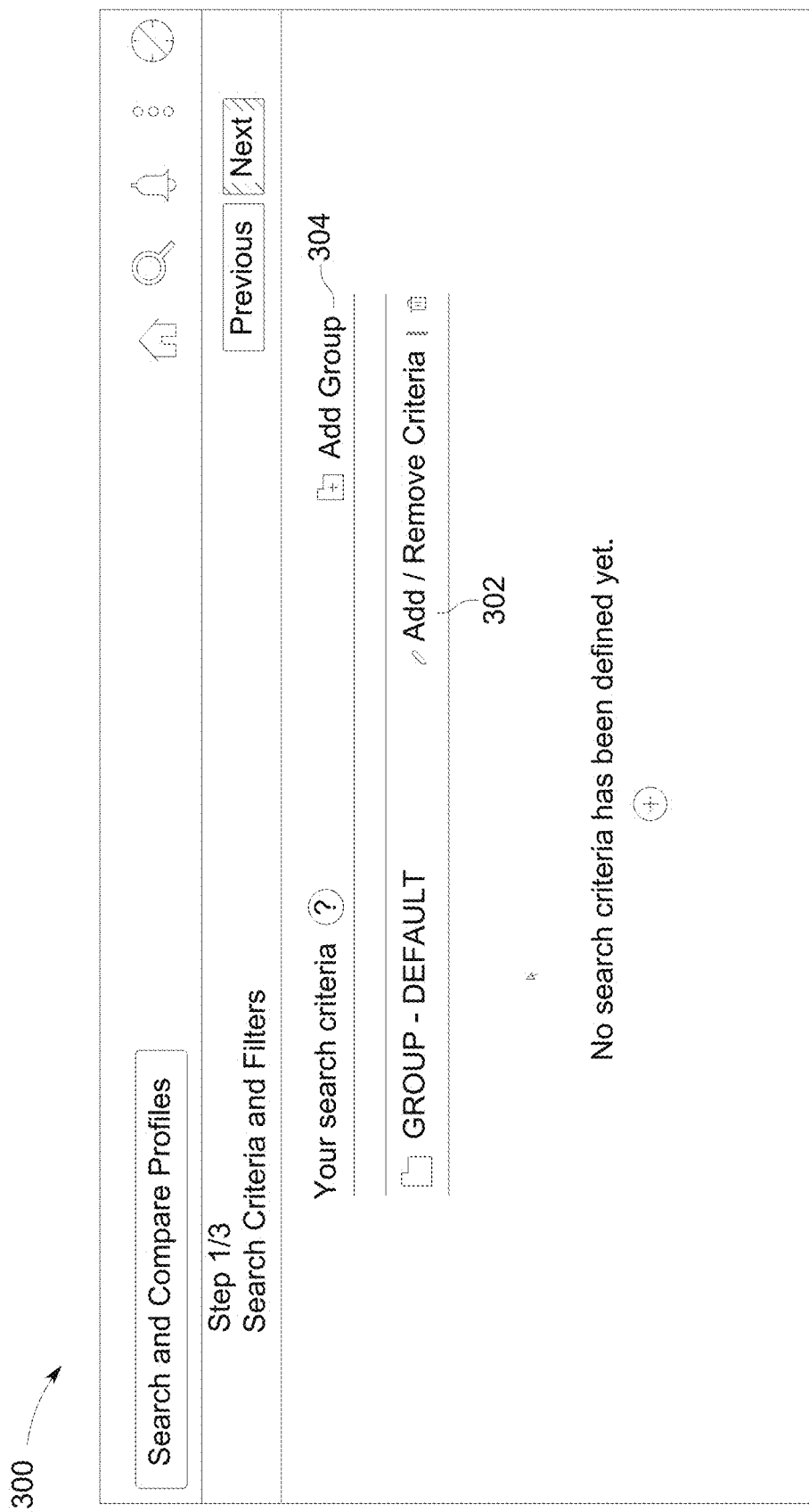
FIG. 3 illustrates an exemplary user interface for adding search criteria.

FIG. 3 illustrates an exemplary user interface 300 for adding search criteria. A user can add or remove search criteria using one or more icons 302 on the screen. For example, the user can add criteria by selecting the icon labelled "Add/Remove criteria." By selecting the icon 302, the system can generate a first graphical user interface for selecting search criteria. A user can also select a search criterion by selecting the Add Group icon 304. Each search criterion can include a constraint on one or more data fields (e.g., so as to indicate that returned records are to have a specific value for the field or have a value for the field within a specific range. The fields available to constrain in a criterion can be determined by fields that are stored in a data store. In some instances, an interface may be presented that accepts a first input that identifies a particular field. In response to the field selection, the interface may present multiple potential values for the field and may be configured to receive one or more particular value selections. A search criterion can then be defined to require the one or more particular values for the particular field. The search criteria can be used to search the stored data records and score the search results. A user can begin selection of criteria by selecting the FIG. 4 illustrates an exemplary graphical user interface 400 for defining search criteria. Each of the search criteria can be categorized using a type 402 and a name or identifier (ID) 404. The type 402 selector accepts an identification of a field, and the selection of the field triggers presentation of values for the field. The graphical user interface 400 can provide a listing 405 of potential value constraints that can be selected for the field. The listing 405 can provide a selection icon 406. The selection icon 406 can provide a graphical indication if the value constraint has been selected or not. For example, as shown in FIG. 4, a minus sign inside the selection icon 406 can indicate that the value constraint has been selected. A plus sign inside the selection icon 406 can indicate that the value constraint is not selected but can be selected.

The user interface 400 can also provide a title input component 408 configured to accept a title for the search criteria. The listing 405 of search criteria can be scrolled to display additional search criteria options that can be viewed in the user interface 400. Each one of the listings is a potential data value that can be selected for the field that has been described above. The user interface 400 can also provide search criteria summary 412. The search criteria summary 412 can provide the total number 414 of search criteria that have been selected. In the example user interface 400 of FIG. 4, the total number 414 is two. The user interface 400 can also present an alphabetized search bar for locating additional search criteria. For example, selecting the letter "T" would list available search criteria beginning with the letter "T." Following selection of the desired search criteria, the user can select the Done button 418 to move to the next interface in the process.

Figure 5:
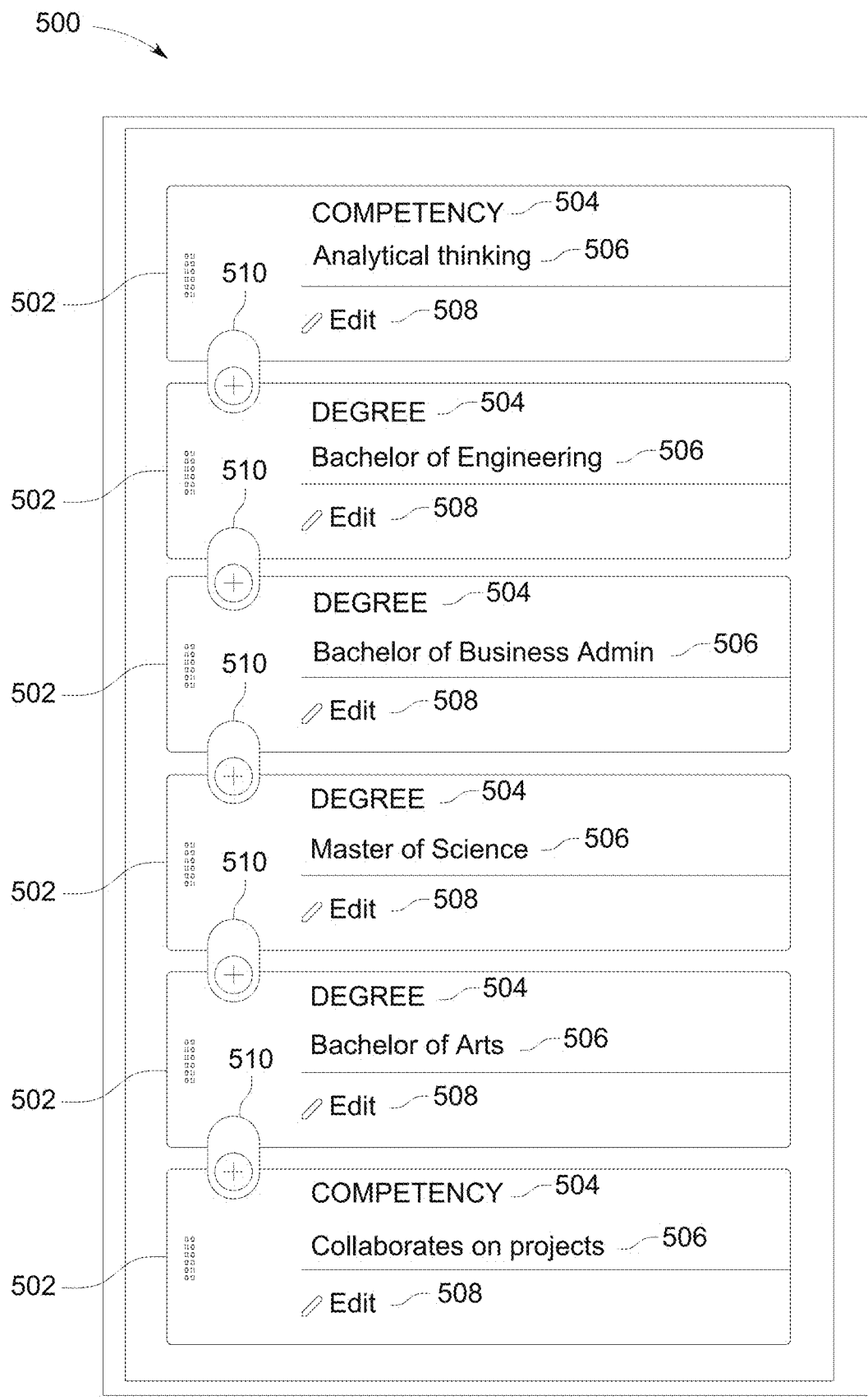
FIG. 5 illustrates an exemplary graphical user interface for selected search criteria.

FIG. 5 illustrates an exemplary graphical user interface 500 for defined search criteria. The graphical user interface 500 depicts one or more search criteria boxes 502. Each search criteria box 502 can specify a field 504 of search criteria and a value constraint 506 of the search criteria. The search criteria box 502 can include an edit icon 508.

The user interface 500 can include one or more graphical Boolean switches 510, each of which can connect multiple search criteria boxes 502. The graphical Boolean switch 510 can be used to indicate the logical operator between the various search criteria. For example, the graphical Boolean switch 510 can be illustrated as a plus (+) symbol indicating the logical operator of "AND" or a forward slash (/) symbol indicating a logical operator of "OR." The plus symbol and the forward slash can also be known as a position of the graphical Boolean switch. A first position can indicate "AND" and a second position can indicate "OR."

As shown in FIG. 5, all of the search criteria boxes 502 are illustrated as being joined using the "AND" logical Boolean switch. Therefore, the logical expression formed by the selected search criteria would need to include all the listed search criteria in FIG. 5. For example, the logical expression for the user interface 500 would be Analytical Thinking Competency AND Bachelor of Engineering Degree and Bachelor of Business Administration Degree AND Master of Science Degree AND Bachelor of Arts Degree AND Collaborates on projects competency. A user can change the logical operator from "AND" to "OR," for example, by tapping on the graphical Boolean switch 510. A user can edit one or more options for secondary search criterial by selecting the edit icon 508. The interface 500 can further be configured to allow a user to reorder the search criteria boxes 502 (e.g., via drag-and-drop outputs), such that the user can control which search criteria are included in each logical operation.

Figure 6:
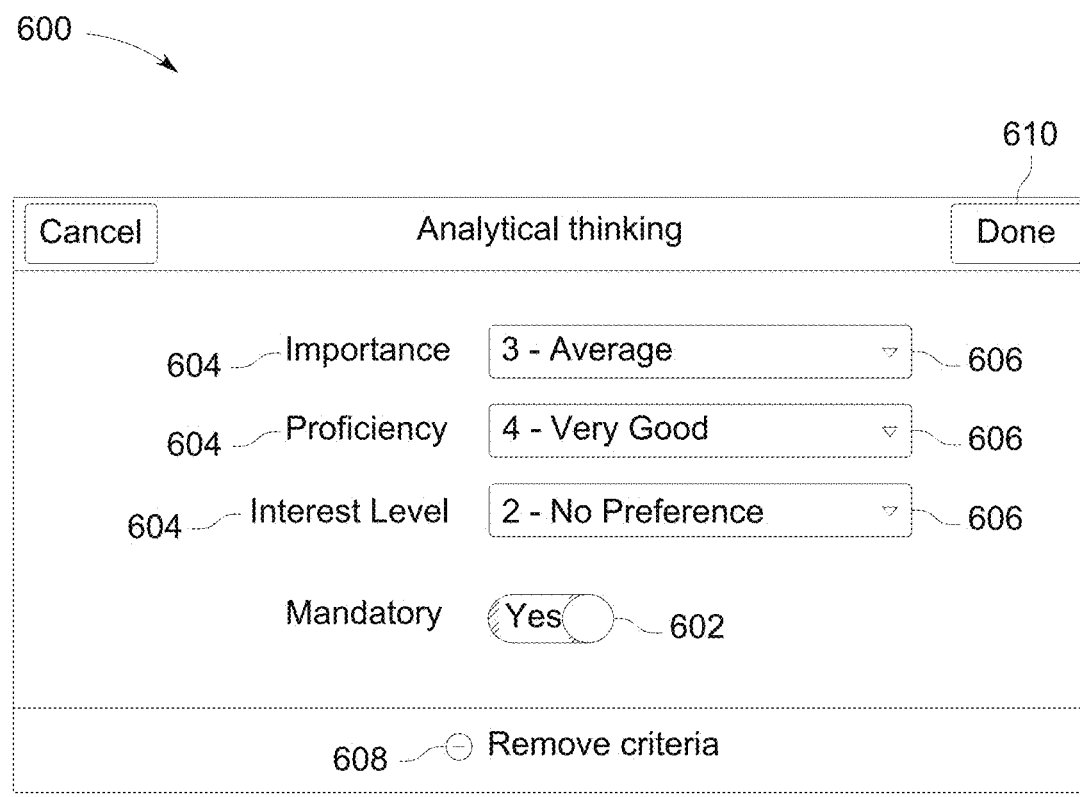
FIG. 6 illustrates an exemplary graphical user interface for setting one or more options for secondary search criteria.

FIG. 6 illustrates an exemplary graphical user interface 600 for setting one or more options for secondary search criteria 604 for some of the primary search criteria. Some of the primary search criteria may not have any secondary search criteria 604. The secondary criteria 604 can vary between different primary search criteria. FIG. 6 illustrates exemplary secondary criteria 604 for the "Analytical thinking" primary search criteria.

The graphical user interface 600 can allow a user to indicate whether the selected secondary search criteria 604 are mandatory or not by using a graphical toggle switch 602. The graphical toggle switch 602 can be toggled between "Yes" and "No." If "Yes" is selected, all of the search result records must include the secondary search criteria. For example, as shown in FIG. 6, if "Yes" is selected the search results must include information responsive to the secondary search criteria for "Analytical Thinking." If "No" is selected, the search results need not include information in the search results responsive the secondary search criteria.

The graphical user interface 600 can include options 606 to further define the secondary search criteria 604. For example, the "Analytical thinking" search criteria can include secondary search criteria 604 including "Importance," "Proficiency," and "Interest Level." Other secondary search criteria 604 can be used. The secondary search criteria 604 settings can be adjusted using one or more options 606. In various embodiments, the options 606 can include a value (e.g., a numerical value). The options 606 can be adjusted be a drop down menu. For example, FIG. 6 illustrates a setting of "3—Average" Importance, "4—Very Good" Proficiency, and "2—No Preference" Interest Level. The user can remove the search criteria using the "Remove Criteria" icon 608. The user can return to the selected search criteria graphical user interface 500 by selecting the Done button 610.

Selected values in the secondary search criteria 604 can be used to define how to assign a score to each of multiple search results. For example, a degree to which a given record satisfies a search criterion may be determined based on the various secondary search criteria 604. Importance secondary search criteria 604 can indicate the significance of the primary search criteria during the search. In FIG. 6, the primary search criterion is "Analytical Thinking." As shown in FIG. 6, the Importance secondary search criteria 604 is listed as a "3" being of average importance. Alternatively, the importance secondary search criteria 604 can "critical" for highest importance or "minor" importance. The importance secondary search criteria 604 can be used to weight the calculation of a score for search results. The higher the importance, the higher the weight for the score for the search results.

In the case of employee records, data can be stored that provides details on employee competencies. For example, a supervisor may assign a rating (e.g., a numerical score) on an employee's Analytical Thinking abilities. This rating can be stored along with the employee's other data records. Similarly, a supervisor may assign an interest level for the employee in the search criteria. By way of example, the interest level can be between "1—No interest," "2—No preference," "3—Mild interest," "4—Moderate interest," and "5—Very interested."

Figure 7:
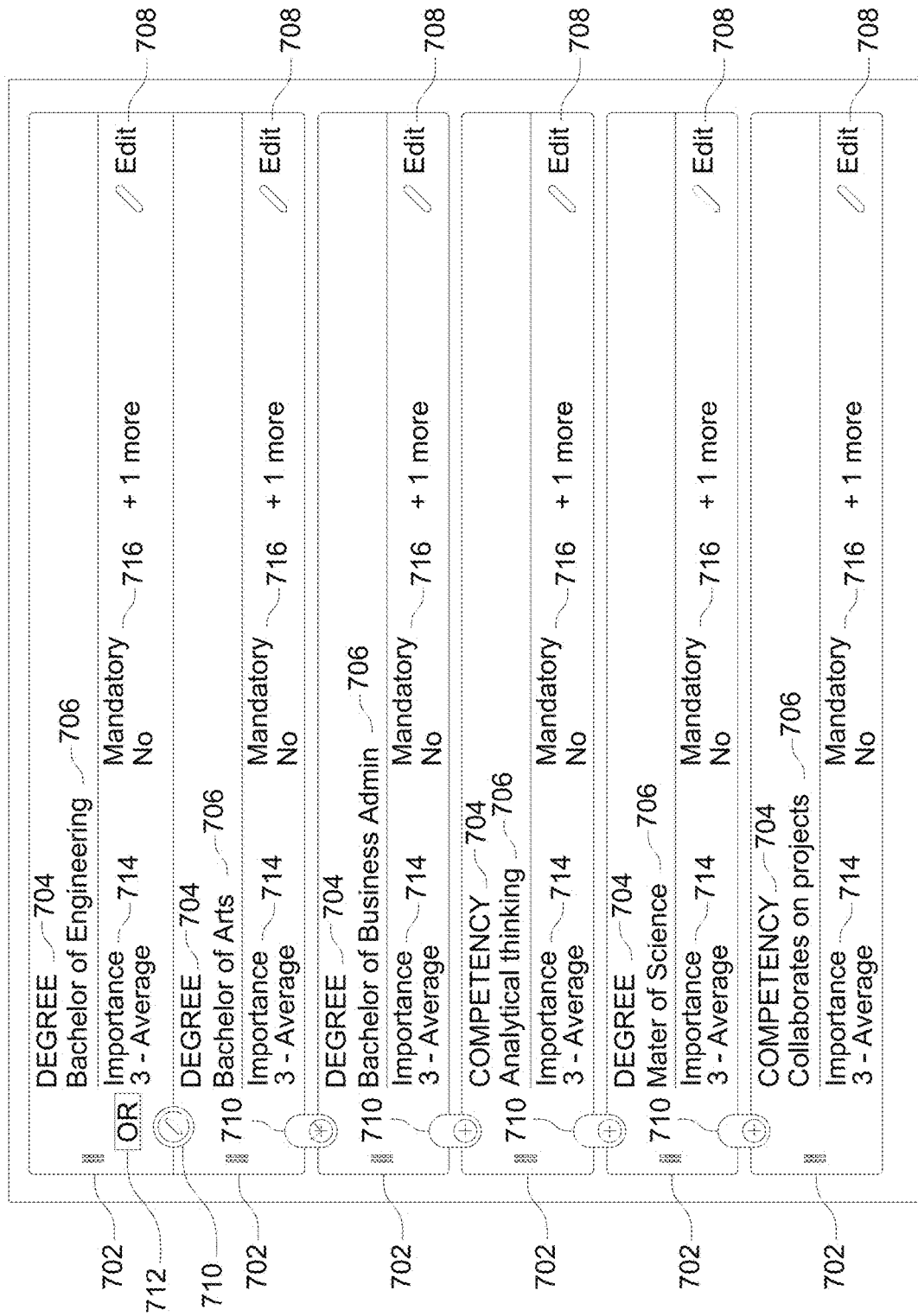
FIG. 7 illustrates an exemplary graphical user interface for adjusting the selected search criteria interface.

A user may select a proficiency level and/or an interest level as it related to the primary search criteria (e.g., Analytical Thinking as shown in FIG. 6). If proficiency level and interest level are configured by the user, the score for the search results can depend on how closely the rating or interest level in the search records match the rating or interest level specified in the search criteria. For example, search result having a proficiency score at or above a "4—Very Good" as shown in FIG. 6 can receive a higher search results score than a proficiency score below "4—Very Good." Other proficiency levels can include "0—No proficiency," "1—little proficiency," "2—Fair proficiency," "3—Good proficiency," "4—Very Good proficiency," and "5—Expert proficiency." Similarly, a record with an interest level at or above "2—No Preference" for "Analytical Thinking" would receive a higher score in the search results. FIG. 7 illustrates an exemplary graphical user interface 700 for adjusting the selected search criteria. The graphical user interface 700 illustrates several search criteria boxes 702 for each of the primary search criteria. The search criteria box 702 can include a type 704 of search criteria and a title 706 of the search criteria. The search criteria box 702 can include an edit icon 708. The search criteria box 702 can be joined with another search criteria box 702 using a graphical Boolean switch 710. The graphical Boolean switch 710 can indicate the logical operator between the various search criteria. The graphical Boolean switch 710 can be graphically illustrated as a plus (+) symbol indicating the logical operator of "AND" or a forward slash (/) symbol indicating a logical operator of "OR." A user can toggle between the logical operators through gestures on the graphical user interface 700. The toggle feature can be enabled using Java Script. After changing the first graphical Boolean switch 710 from "AND" to "OR" a momentary "OR" indicator 712 can appear on the graphical user interface 700 to inform the user of the change. The user interface 700 can also display one or more secondary search criteria 714 and a mandatory indicator 716.

Figure 8:
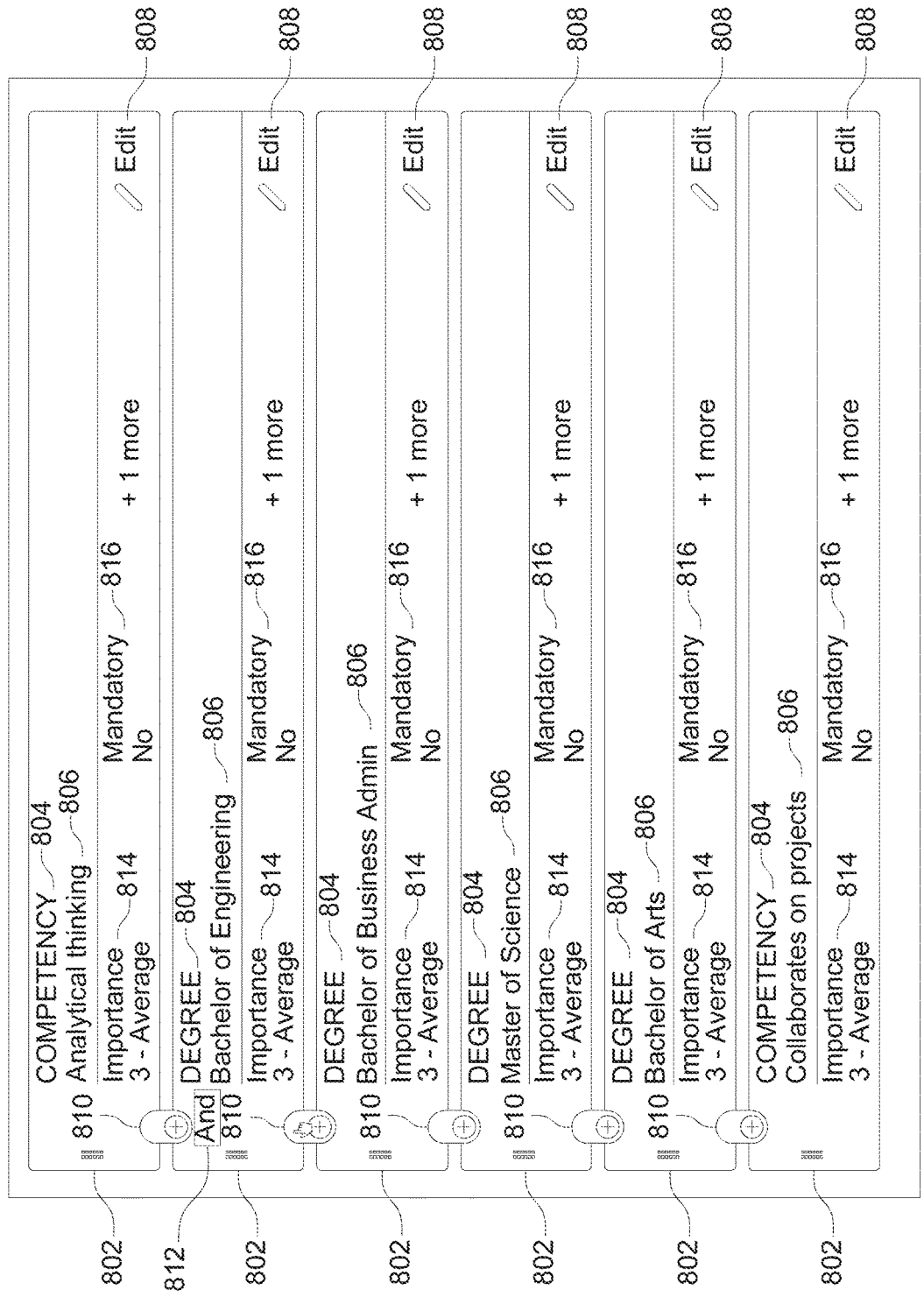
FIG. 8 illustrates an exemplary graphical user interface for adjusting the selected search criteria interface.

FIG. 8 illustrates an exemplary graphical user interface 800 for adjusting the selected search criteria. The graphical user interface 800 illustrates several search criteria boxes 802. The search criteria box 802 can include a type 804 of search criteria and a title 806 of the search criteria. The search criteria box 802 can include an edit icon 808. The search criteria box 802 can be joined with another search criteria box 802 using a graphical Boolean switch 810. The graphical Boolean switch 810 can indicate the logical operator between the various search criteria. The graphical Boolean switch 810 can be graphically illustrated as a plus (+) symbol indicating the logical operator of "AND" or a forward slash (/) symbol indicating a logical operator of "OR." After changing the first graphical Boolean switch 810 from "OR" to "AND" a momentary "And" indicator 812 can appear on the graphical user interface 800 to inform the user of the change. The user interface 800 can also display one or more secondary search criteria 814 and a mandatory indicator 816.

Figure 9:
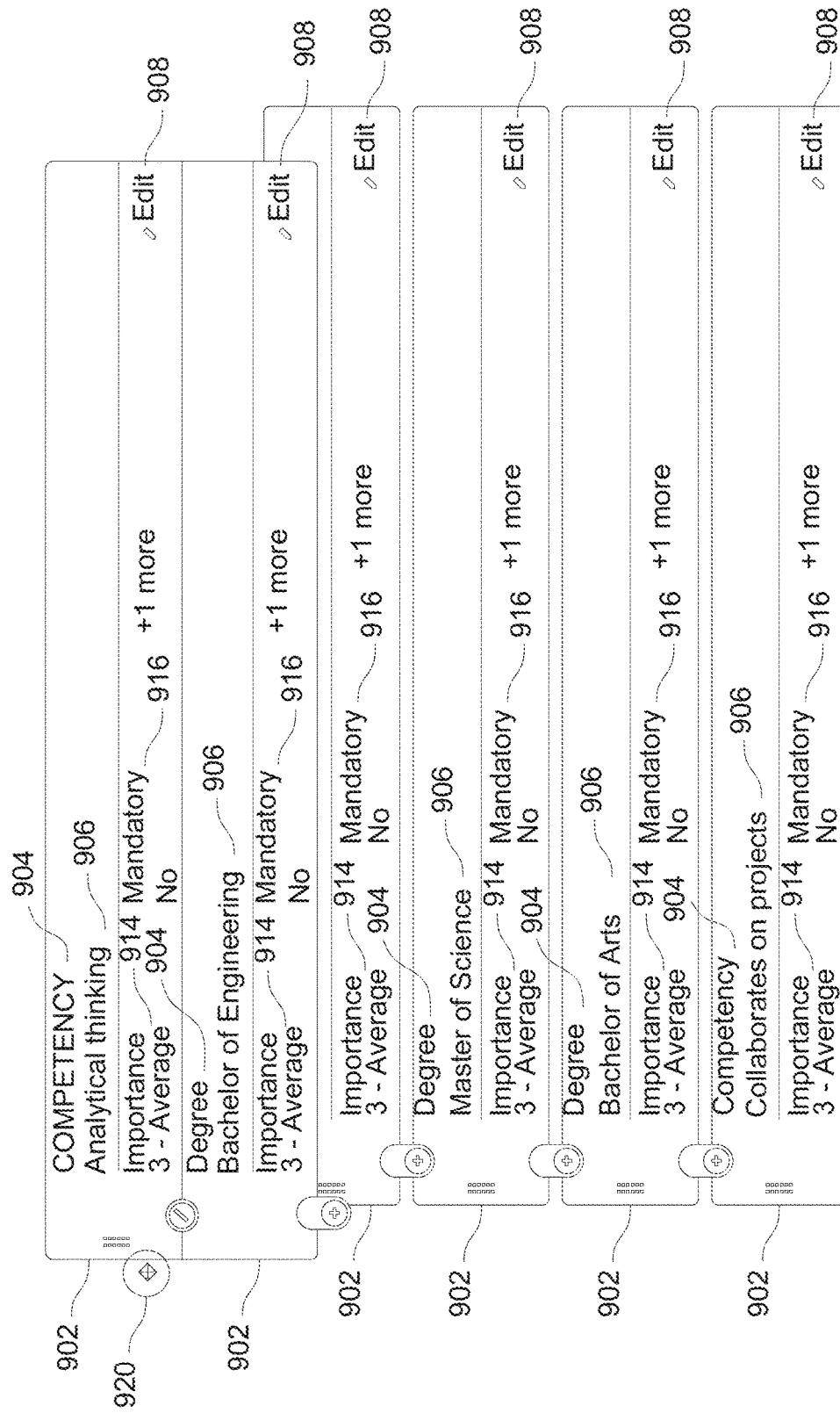
FIG. 9 illustrates an exemplary graphical user interface for adjusting the selected search criteria interface.

FIG. 9 illustrates an exemplary graphical user interface 900 for adjusting the selected search criteria. The graphical user interface 900 illustrates several search criteria boxes 902. The search criteria box 902 can include a type 904 of search criteria and a field 906 of the search criteria. The search criteria box 902 can include an edit icon 908. The search criteria box 902 can be joined with another search criteria box 902 using a graphical Boolean switch 910. The graphical Boolean switch 910 can indicate the logical operator between the various search criteria. The graphical Boolean switch 910 can be graphically illustrated as a plus (+) symbol indicating the logical construct of "AND" or a forward slash (/) symbol indicating a logical operator of "OR." The user interface 900 can also display one or more secondary search criteria 914 and a mandatory indicator 916 within the search criteria box 902. For example, a "Collaborates on projects" competency can include an "Importance" secondary search criteria 914 and one other search criteria (e.g., Proficiency) that is not listed on the display in the current view of the user interface 900.

FIG. 9 illustrates the drag and drop features for arranging the logical expression for the selected search criteria. In various embodiments, the drag and drop features can be configured such that cursor, touch-screen or gesture inputs can indicate a selection of one or more criteria and/or can indicate to which relative position the selected one or more criteria is moved. As shown in FIG. 9, the "Analytical thinking" search criteria box 902 is connected with the "Bachelor of Engineering" search criteria box 902 using a graphical Boolean switch set at "OR". Therefore, the adjoining search criteria boxes 902 would move together when selected and moved. The selected boxes 920 can be moved between any of the search criteria boxes 902 listed in the user interface 900. By moving the search criteria in the user interface 900, the selected search criteria can be moved next to one or more other search criteria to join using an "OR" logical connector.

Figure 10:
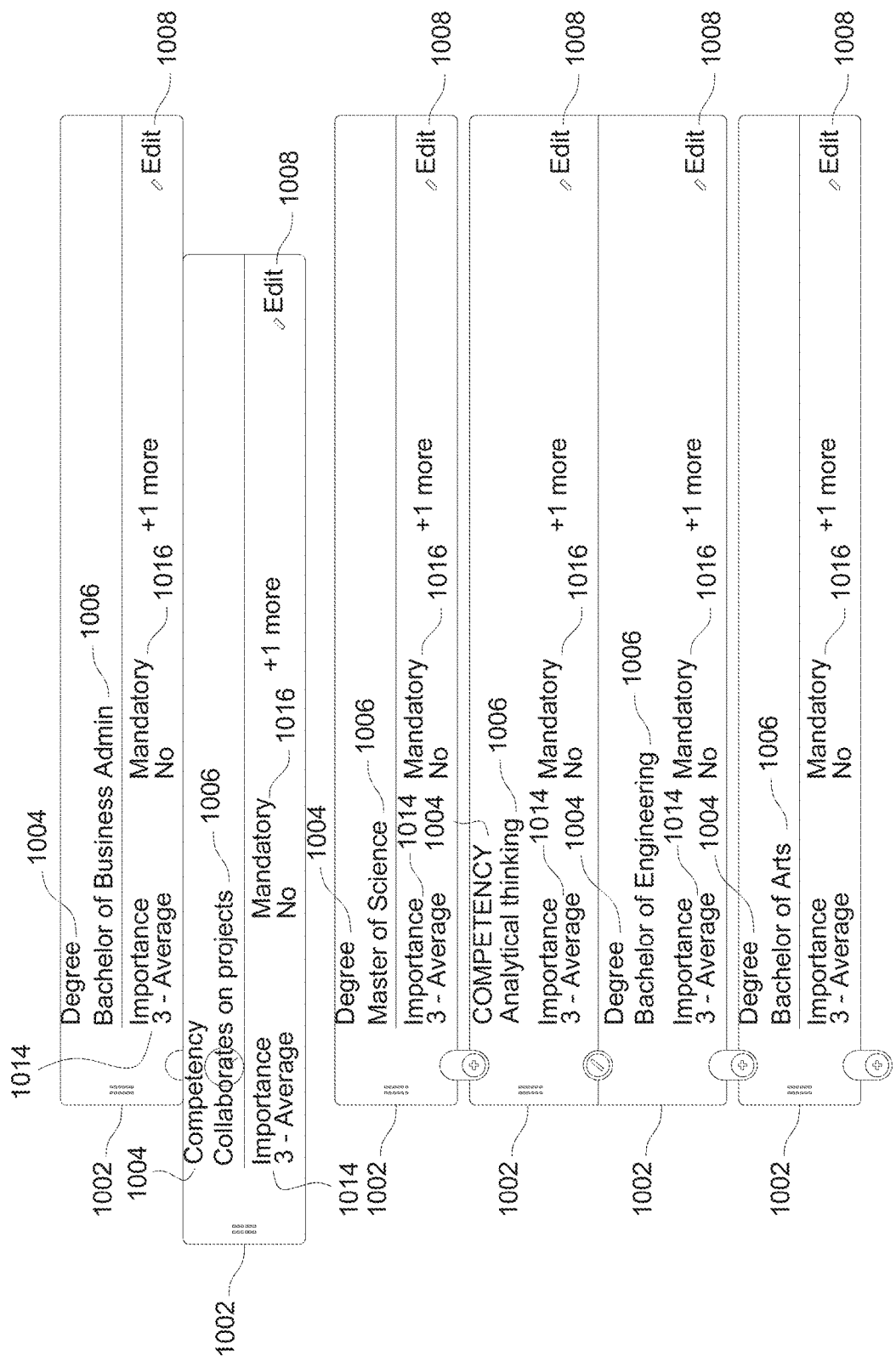
FIG. 10 illustrates an exemplary graphical user interface for adjusting the selected search criteria interface.

FIG. 10 illustrates an exemplary graphical user interface for adjusting the selected search criteria interface. The graphical user interface 1000 illustrates several search criteria boxes 1002. The search criteria box 1002 can include a type 1004 of search criteria and a title 1006 of the search criteria. The search criteria box 1002 can include an edit icon 1008. The search criteria box 1002 can be joined with another search criteria box 1002 using a graphical Boolean switch 1010. The graphical Boolean switch 1010 can indicate the logical operator between the various search criteria. The graphical Boolean switch 1010 can be illustrated as a plus (+) symbol indicating the logical operator of "AND" or a forward slash (/) symbol indicating a logical operator of "OR." The user interface 1000 can also display one or more secondary search criteria 1014 and a mandatory indicator 1016.

FIG. 10 further illustrates the drag and drop features for arranging the logical expression for the selected search criteria. As shown in FIG. 10, the selected search criteria box 1020 includes the "Collaborating on projects" competency search criteria box 1002. The selected box 1020 can be moved between any of the search criteria boxes 1002 in the user interface 1000.

FIG. 11 illustrates an exemplary comparison 1100 of search results. The exemplary comparison can display information for multiple search results. For example, if the search was conducted for a search of current employees, the search results can display search results of multiple employees (e.g., example results 1102, 1104, and 1106). In various embodiments, the search results can be listed in order of score. In various embodiments, the score and be displayed on the exemplary comparison 1100 page. For example, the first result 1102 has a 100% match, the second result 1104 has a 94% match, and the third result 1106 has a 91% match. The comparison 1100 of the search results can include various stored information for each of the search results. In addition to values responsive to the search criteria, the various stored information can include other information for the search results records that may be relevant. For example, for an employee-type search the various information can include a Business Unit, a Company name, a Performance Rating value, a Department, Full Time or Part Time status information, and employment Location information. FIG. 11 provides a tabular listing of the top search results for comparison by a user.

FIG. 12 illustrates an exemplary list 1200 of search results. Each of the search results 1202 in the list 1200 can be listed in order of a score 1204 as described above. The score can be from 100% to 0%. The search result box 1202 can list the name 1206 of the search result and various other characteristics 1208 (e.g., job title, department, and location). The exemplary list 1200 allows for one or more filters 1210 to be applied to the search results. FIG. 12 allows a user to review and compare the various records responsive to the search using the logical expression.

Figure 13:
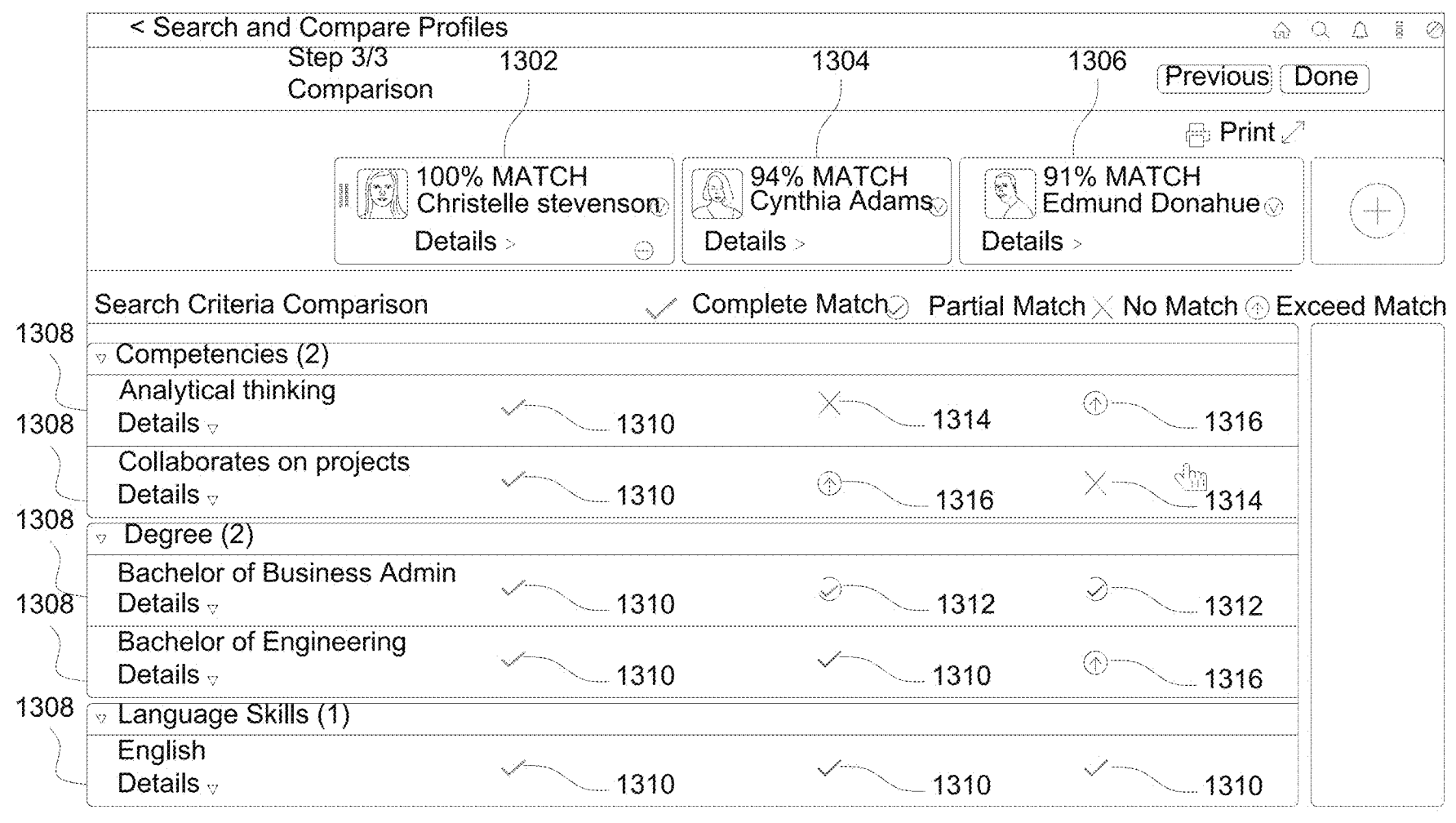

FIG. 13 illustrates an exemplary comparison 1300 of search results by search criteria.

In comparison 1300 a set of baseline search results (e.g., corresponding to a set of employees 1302, 1304 and 1306) are depicted with a metric indicating an extent to which the corresponding records matched applicable search criteria 1308. The comparison 1300 can show whether each of the employees matches 1310, partially matched 1312, did not match 1314, or exceeded match 1316 the various search criteria 1308.

Figure 14:
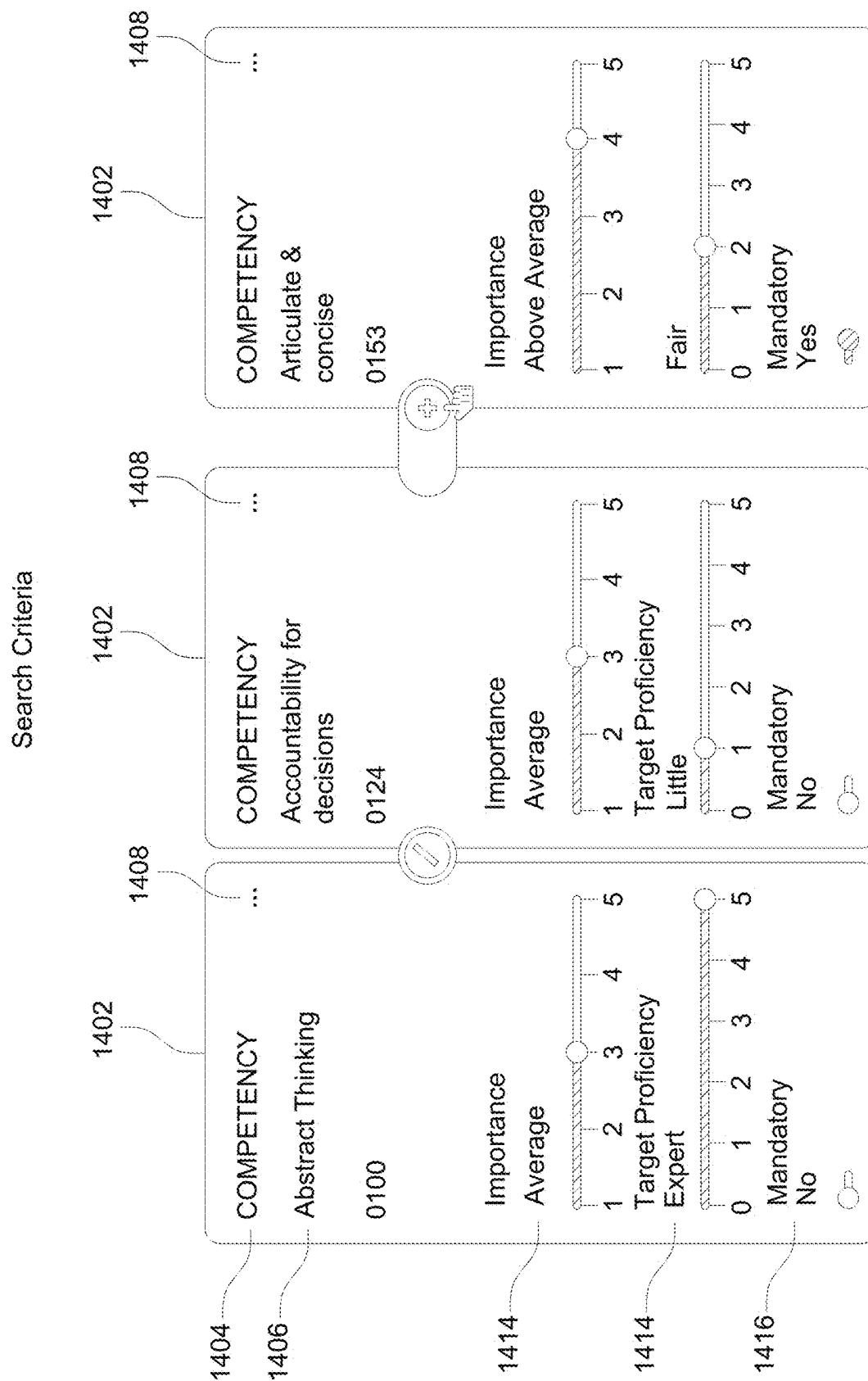
FIG. 14 illustrates an exemplary graphical user interface for selected search criteria configured for mobile devices.

FIG. 14 illustrates an exemplary graphical user interface 1400 for generating a logical expression in which the user interface 1400 is configured for mobile devices. As shown in FIG. 14, multiple search criteria boxes 1402 can be linked with another search criteria box 1402 using a graphical Boolean switch 1410. The graphical Boolean switch 1410 can indicate the logical operator between the adjacently represented search criteria. The graphical Boolean switch 1410 can be illustrates as a plus (+) symbol indicating the logical operator of "AND" or a forward slash (/) symbol indicating a logical operator of "OR."

The search criteria box 1402 can include a type 1404 of search criteria and a field 1406 of the search criteria. The search criteria box 1402 can include an edit icon 1408. A user can drag and drop the search criteria boxes 1402, thereby allowing the user to specify which search criteria are operands in a given Boolean operation. The search criteria box 1402 can be joined with another search criteria box 1402 using a graphical Boolean switch 1410. The graphical Boolean switch 1410 can indicate the logical operator between the various search criteria. The spacing between the search criteria can be representative of parentheses. For example, FIG. 14 represents (Search Criteria A OR Search Criteria B) AND Search Criteria C. This means that Search Criteria C is always required.

The user interface 1400 can also display one or more secondary search criteria 1414 and a mandatory indicator 1416. The graphical user interface 1400 can be presented vertically with respect to the display of the mobile device. Alternatively, the graphical user interface 1400 can be presented horizontally with respect to the display of the mobile device.

In various embodiments, the graphical user interface 1400 also provides an easy way to adjust the one or more options for secondary search criteria 1418. For example, the graphical user interface 1400 can include one or more slider bars, toggle switches, soft keys, or drop down menus.

Figure 15:
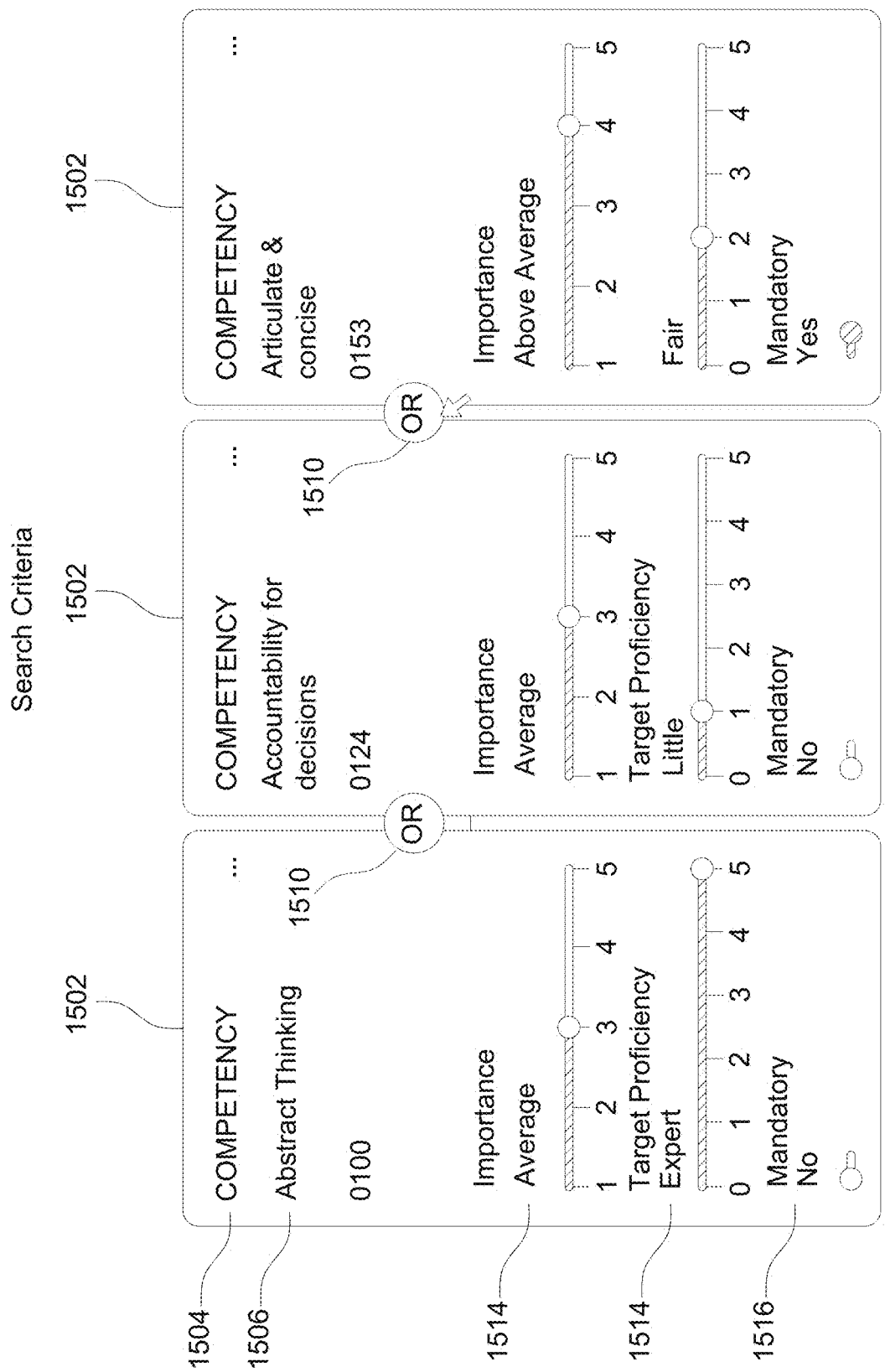
FIG. 15 illustrates an exemplary graphical user interface for selected search criteria configured for mobile devices.

FIG. 15 illustrates an exemplary graphical user interface for generating a logical expression in which the user interface 1400 is configured for mobile devices. As shown in FIG. 15, multiple search criteria boxes 1502 are linked with another search criteria box 1502 using a graphical Boolean switch 1510. The graphical Boolean switch 1510 can indicate the logical operator between the various search criteria.

The graphical Boolean switch 1510 can be illustrated as the word "AND" in a circle indicating the logical operator of "AND" or the word "OR" in a circular indicating a logical operator of "OR."

The search criteria box 1502 can include a type 1504 of search criteria and a title 1506 of the search criteria. The search criteria box 1502 can include an edit icon 1508. A user can drag and drop the search criteria boxes 1502 thereby allowing for editing the logical expression for the search. Each search criteria box 1502 can be joined to an adjacent search criteria box 1502 via a graphical Boolean switch 1510. The graphical Boolean switch 1510 can indicate the logical operator that relates the adjacent search criteria. In various embodiments, the search criteria boxes 1502 joined by an "OR" graphical Boolean switch 1510 are displayed closer together than the search criteria boxes joined by an "AND" graphical Boolean switch.

Figure 16:
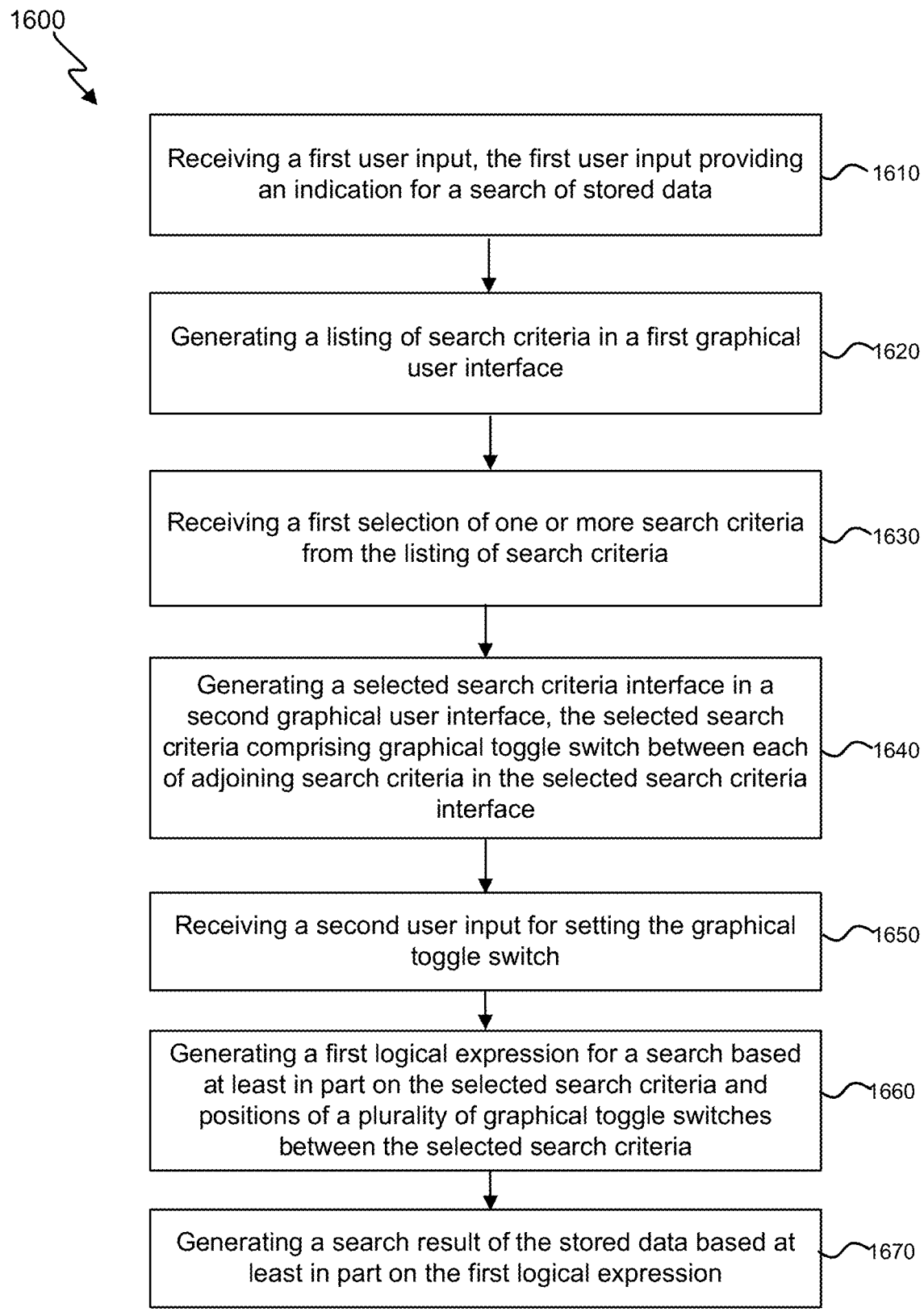
FIG. 16 illustrates an exemplary flow chart for receiving multiple search criteria and creating a first logical expression.

FIG. 16 is a flow chart of an example process 1600 for defining multiple search criteria using a graphical Boolean switch to creating a first logical expression for generating search results. The process 1600 can include receiving multiple search criteria and creating a first logical expression. In some implementations, one or more process blocks of FIG. 16 can be performed by a server. In some implementations, one or more process blocks of FIG. 16 can be performed by another device or a group of devices separate from or including the server.

At 1610, process 1600 can include receiving a first user input, the first user input providing an indication for a search of stored data. In various embodiments, the process 1600 can provide a list of possible searches that a user can perform based at least in part on the type of data stored in the database. For example, if network fault codes and error messages are stored in a data log for a network, the types of searches can relate to fault codes and error message data. A list of possible searches can be displayed for a user to make a selection of the type of search desired. The first user input can be a selection using a pointing device, a gesture on a touchscreen display, a keyboard entry, a Chabot entry, or an audio entry. The first user input and subsequent user inputs may be made via any of these mechanisms. The list of search criteria can change based in part on the type of search selected.

At 1620, process 1600 can include generating a list of search criteria in a first graphical user interface. A server can identify the list of search criteria by searching the stored search criteria specific to the type of search selected at 1610. The list of search criteria can be generated using a scripted programming language (e.g., JavaScript) by accessing a list of stored search criteria specific to the selected search, at 1610, and the type of data records stored in the stored data. For example, employee search criteria can be generated and displayed for employee-type searches.

At 1630, process 1600 can include receiving a first selection of one or more search criteria from the list of search criteria. Step 1630 can be repeated to select multiple search criteria from the list of search criteria. After a user has completed adding search criteria, the user can proceed to step 1640 to generate the logical expression via the second graphical user interface.

The techniques described herein can be performed using an Oracle Database by default. In addition, the techniques are supported by Microsoft SQL Server and IBM DB2 severs. The techniques described herein do not have any specific server dependency.

At 1640, process 1600 can include generating a selected search criteria interface in a second graphical user interface (GUI). Representations of the multiple selected search criteria from step 1630 can initially be presented in the second GUI as search criteria boxes adjacent to each other with each of the multiple selected search criteria being connected using a graphical Boolean switch between each of the adjacent search criteria. The default graphical Boolean switch can be an "AND" operator. The second GUI can be displayed to allow a user to edit the logical expression. The interface may include, with respect to each pair of one or more pairs of search criteria, a representation of a logic operator. For example, pairs of search criteria may correspond to each search criteria that are visually juxtaposed or adjacent, and a representation of a logical-operator input component (e.g., initially set to a default logical-operator value) may be presented at the intersection of the representations. The interface may be configured to receive input that identifies a particular logical operator (e.g., AND, OR, NOT, XOR) that relates the pair of search criteria.

A container can be used to store the search criteria and related information. Inside the container, the Boolean Switch should be placed in an absolute position (e.g., "AND" or "OR"). The Boolean Switch can be a second container which contains an element. The second container can be used for the switch background and shape. The inside element can be used for the actual switch which moves and changes according to the expressions. The inside element can include a text label if the application is not multi-lingual, or only a symbol with the "title" attribute. A simple Java Script can be used to make the switch toggle, make the data container draggable, and create animations on expression change.

At 1650, process 1600 can include receiving a second user input for setting the graphical Boolean switch. Setting the graphical Boolean switch corresponds to selecting a particular logical operator that is to be used when evaluating search criteria corresponding to the joined representations.

At 1660, process 1600 can include generating a first logical expression for a search based at least in part on the selected search criteria and selections of a plurality of graphical Boolean switches between the selected search criteria. The process 1600 can identify the multiple selected search criteria in the user interface. The process 1600 can identify the selected position of each of the graphical Boolean switches between the multiple selected search criteria. The process can identify whether each of the graphical Boolean switches represents either an "AND" logical operator or an "OR" logical operator.

For search criteria connected using an "OR" logical operator the logical expression can combine the search criteria in a group such as (Criterion A OR Criterion B OR Criterion C). For search criteria connected by an "AND" logical operator logical expression can be combined together such as Criterion A AND Criterion B AND Criterion C.

At 1670, process 1600 can include generating a search result of the stored data based at least in part on the first logical expression. The logical expression may be used to query a data store. The process 1600 can retrieve a subset of a set of stored records, where the subset conforms to criteria in the logical expression. The retrieved subset of stored records can be scored using the scoring process described above. After scoring, the subset of scored records can be displayed for the user.

The process 1600 can use the PeopleTools Search Framework by way of Integration Broker to generate search results and perform comparisons between matching profiles. In order to complete searches, the search engine uses a set of indexes that contain data about the profiles in the database.

The process uses the profile type definition to determine what profile information is included in the index. Only those properties defined as searchable in the profile type are selected for indexing. The process retrieves active profiles, the active profile items in those profiles, and the searchable properties to include in the index. For profile types with a profile type of Person, the Schedule Search Index process retrieves manager hierarchy data and row level security for the person ID associated with the profile. If a profile type belongs to a profile group type that is defined as searchable, the profile group is also included in the index.

The index created by this process is separate from the database. It is a snapshot of the database at one point in time and does not remain synchronized with the profile data in the database unless you routinely update the index.

When the Schedule Search Index is run, the application engine process PTSF_GENFEED generates an XML feed and creates a schedule in the search engine, which in turn crawls the XML feed and builds the search index.

With the exception of facets for the search, searching is language-independent since only the codes and not the associated descriptions are indexed. For example, if a user searches for the competency Forecasting whose content item ID is 1000, then the search query will look for item ID 1000 and not for the word Forecasting.

In some implementations, process 1600 includes generating secondary search criteria for one or more search criteria listed on the second graphical user interface. The process can include receiving a third user input. The third user input can include a value constraint for one or more secondary search criteria. The process 1600 can include generating a third graphical user interface configured to receive a fourth user input to select one or more value constraints for the one or more secondary search criteria. The process 1600 can include receiving the fourth user input. The fourth user input can include selecting the one or more value constraints for the one or more secondary search criteria. The process 1600 can include generating a second logical expression for the search based at least in part on the selected search criteria, the positions of the plurality of the graphical Boolean switches between the selected search criteria, and the selected value constraints for the one or more secondary search criteria. The process 1600 can include generating a second search result of the stored data based at least in part on the second logical expression.

In some implementations, one of the one or more options for the secondary search criteria includes a mandatory indicator, the mandatory indicator indicates whether the secondary search criteria is an exact match to the data in the various records of the search result.

In some implementations, one of the one or more options for the secondary search criteria includes a value indicating an importance of the search criteria to be listed in the search result.

In some implementations, one of the one or more options for the secondary search criteria includes a value indicating a proficiency of the search criteria to be listed in the search result.

In some implementations, process 1600 includes receiving a fifth user input selecting one of the selected search criteria. The process 1600 can include dragging the one of the selected search criteria on the second graphical user interface from a first position to a second position. The process can include receiving a sixth selection to change the graphical Boolean switch. The process 1600 can include generating a third logical expression for a search based at least in part on the selected search criteria and the positions of the plurality of graphical Boolean switches between the selected search criteria. The process 1600 can include generating a third search result of the stored data based at least in part on the third logical expression.

In some implementations, the second graphical user interface presents the selected search criteria interface in either a horizontal format or a vertical format. The horizontal format and the vertical format are with respect to a display screen.

Although FIG. 16 shows example steps of process 1600, in some implementations, process 1600 can include additional steps, fewer steps, different steps, or differently arranged steps than those depicted in FIG. 16. Additionally, or alternatively, two or more of the steps of process 1600 can be performed in parallel.

In various embodiments, a server device can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a computing device, cause the one or more processors to perform operations of any of the methods described above.

Figure 17:
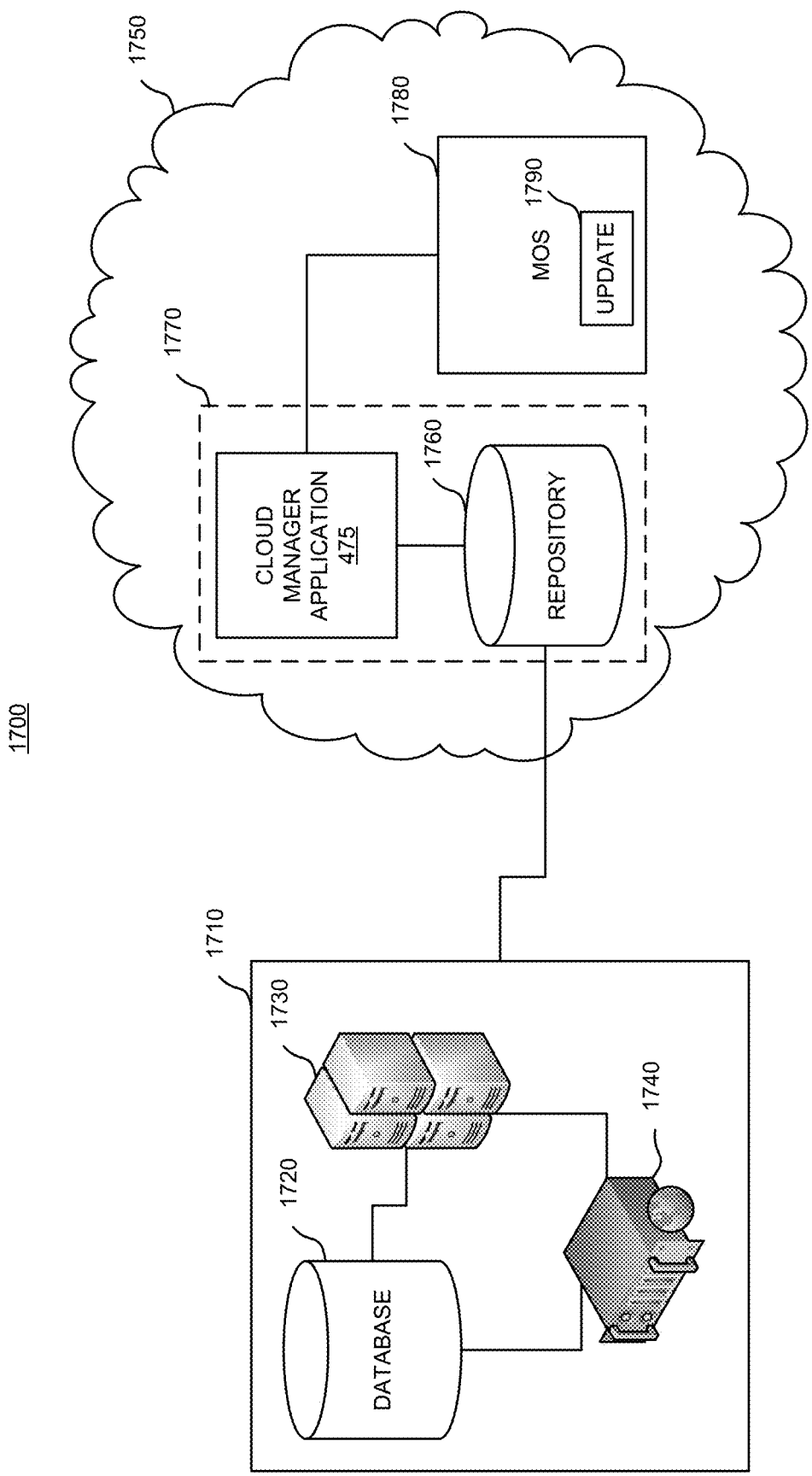
FIG. 17 is a diagram of a server system according with various embodiments of the disclosure.

FIG. 17 shows an example network environment 1700 for exporting local applications to cloud systems. Network environment 1700 can include local system 1710 and cloud system 1750. Local system 1710 can include one or more internal subsystems, such as database server(s) 1720, application server(s) 1730, and web server(s) 1740.

Disclosed application codes can run on on-premises, in the cloud, or a combination of both. The disclosed application can be a browser-based application and support various browsers. The disclosed graphical user interface can be (for example) partly or fully Java Script driven at the frontend. The graphical Boolean switch can be configured to allow the user to toggle between the "OR" and "AND" logical operators. Each switch can be positioned to be visually associated with multiple search criteria representations. Each switch may be configured to be set to a first position (e.g., associated with an "AND" representation) that indicates that a query is to determine whether each of multiple search criteria are satisfied with respect to individual records or a second position (e.g., associated with an "OR" representation) that indicates that a query is to determine whether any of multiple search criteria are satisfied.

For example, database server 1720 can store the data files associated with the local application, application server 1730 can store the application code of the local application, and web server 1740 can store the web code of the local application. Further, local system 1710 may be associated with an entity (e.g., a company). Each of the internal subsystems of local system 1710 may not be included in a cloud system or distributed within a cloud network. In some implementations, the physical components of the database servers 1720, application servers 1730, and the web servers 1740 may be on-premises at a facility associated with the entity. Each of database servers 1720, application servers 1730, and web servers 1740 can, at least in part, execute the local application.

It will be appreciated that while the term "local" is used to refer to systems being located at a facility of the entity that are not hosted on a cloud network, the present disclosure is not limited thereto. For example, local system 1710 and its internal subsystems may or may not be physically on-premises at a facility of the entity, but rather, the internal subsystems can be located in areas that are not affiliated with the entity (e.g., rented servers). In addition, local system 1710 can be used to run local applications that are managed by the entity.

In some implementations, cloud system 1750 can be configured to store topology 1755, templates, 1760, deployment data 1765, provisioning system 1770, orchestration flow 1775, and repository 1780. For example, cloud system 1750 may be a cloud network that is administered and operated by ORACLE. Repository 1780 can include one or more storage systems for storing all of the deployment packages of incoming local applications that are being exported from local systems to cloud system 1750. Further, repository 1780 can store all versions of the local application that were created using the "clone-to-template" feature. Cloud system 1750 can include one or more applications, systems or engines that are configured to manage one or more aspects of a cloud manager application. For example, a cloud manager administrator can operate or access the cloud manager application to manage operations of cloud system 1750. Further, repository 1780 can store the deployable and/or exportable versions of the local applications that have migrated from local system 1710 to cloud system 1750. The cloud manager application may be an application that provides deployment of applications environments in cloud system 1750. For example, the cloud manager application can deploy PEOPLESOFT applications (e.g., human capital management (HCM), financial supply chain management (FSCM), etc.) on cloud system 1750 in an automated way.

In some cases, the network administrators of local system 1710 may seek to export their local applications to the cloud (e.g., to increase scalability of the local application, use the location application in a different environment, such as from a training environment to a production environment, and so on). Embodiments of the present disclosure enable the network administrators of the local system to export their local applications from the internal subsystems to the cloud system 1750. In some cases, during the life cycle of an application, application administrators may migrate local applications to cloud system 1750. During the migration process, application administrators can export the local application environment using deployment packages and import the deployment packages to cloud system 1750. The cloud manager application can read the deployment packages of the local application and deploy the application on cloud system 1750 using provisioning system 1770.

In some implementations, the cloud manager application can enable users to create and deploy a distributed application on cloud system 1750. For example, users can set up a cloud account associated with cloud system 1750. Cloud accounts can enable users to access the functionality of the cloud manager application. Once an account is created, the user can perform various operations associated with the cloud manager application, including exporting local applications to cloud system 1750, spawning new virtual machines, creating templates of the local application, and so on.

Further, once a local application has been exported to cloud system 1750 (e.g., when the corresponding deployment packages of the local application have been stored in repository 1780); users can create a template of the local application and associate one or more topologies to the template. For example, one topology may correspond to one environment (e.g., a development environment), and another topology may correspond to another environment (e.g., a production environment). A topology can be defined as different nodes of local application. For example, a topology may be defined by physical nodes and configuration settings, such as CPU, distribution of services, allocation of disk storage to virtual machines, networks, ports, and other suitable configuration settings. Further, applications can include or be executed on middle tiers, database servers, application servers, web servers, services, and so on. On cloud system 1750, these systems may be distributed on any number of virtual machines and/or compute nodes. For example, a local application may be executed, such that the database server, the application server, and the web server each run on a single node (e.g., server), and after the local application is migrated to the cloud system 1750, the local application may be configured to use a topology where each of the database server, application server, and the web server are executed on different nodes. Users can define configurations of each node (e.g., defining how many CPUs a database should run, defining web servers, defining storage space and speed, etc.). Once a topology has been defined, the topology can be associated with an environment template (as shown FIG. 7, for example). When a template has been defined for an application, the application can be distributed to other systems by creating one or more templates of the application and associating each of the one or more templates with a defined topology (not necessarily the same topology).

In some implementations, exporting a local application to cloud system 1750 can include downloading a utility application (e.g., a .zip file that stores an export application) from cloud system 1750 (e.g., from the cloud manager application). Once downloaded on local system 1710, the utility application can be triggered. When triggered, the utility can be configured to receive input from users. For example, a user can point the utility to the local application environment (e.g., the user can identify a network location of database servers, application servers, and/or web servers of the local application). In other words, the utility application can discover the local environment to identify the underlying framework of the application. For example, the utility application can discover the network topology of the local application, the middleware data (e.g., version of the database server, operating system, application servers, and/or web servers). Once discovered, the utility application can store the discovered configuration settings (e.g., the network topology and the middleware data) in one or more deployment packages (e.g., .zip files) that store the discovered configuration settings in an exportable format. The deployment packages can be used to export the local application. As a non-limiting example, the deployment packages can include two .zip files; one including the configurations of the database server, and the other can include application-related configuration settings (e.g., middle tier data). The deployment packages may be used to transform the application into an exportable format. Further, the utility can upload the deployment packages to cloud system 1750. Uploading the deployment packages can include storing the deployment packages in repository 1780. The cloud manager application can be configured to create a new environment for the local application using the deployment packages. Advantageously, the local application may have been running on a single physical node when it was running in local system 1710, but once exported to cloud system 1750, the application can be de-serialized and can run on different network topologies. In addition, as an advantage, the local application can be exported together with all of the customization configuration settings that existed before the application was exported.

In some implementations, the application can be serialized at local system 1710 into an exportable format that handles customizations, including database servers and middle tiers, and then de-serialized on the cloud system 1750 so that the applications can be deployed on cloud system 1750. In some implementations, a deployment package may be a self-contained unit that contains all of the configuration settings and middleware for the cloud system 1750 to run an application. In addition, deployment packages can include application-layer customizations that were defined at the local system 1710. As another example, deployment packages can include middleware configurations, databases, size of storage space in databases, middle tier storage, middle tier configurations, and so on. Further, in some implementations, deployment packages enable all of the configurations of the application to be represented in a single format.

In some implementations, provisioning the local application on cloud system 1750 may be performed using several components. For example, the cloud manager application (not shown) may facilitate the provisioning of the local application on cloud system 1750 using a defined topology 1755, a particular template 1760 of the local application, deployment data 1765 (e.g., one or more deployment packages of the local application), a provisioning system 1770, an orchestration process flow 1775, and the repository 1780. In some implementations, the provisioning system 1770 may perform the steps of the orchestration flow in order to provision the local application on the cloud servers of the cloud system 1750. For example, the orchestration flow evaluates the defined topology to determine an infrastructure to create for the application environment. In some examples, the provisioning system 1770 may define the configuration settings of compute nodes (e.g., an amount of Random Access Memory (RAM) to allocate to one or more virtual machines) to deploy the local application on cloud system 1750. The orchestration flow may begin by deploying the database server for the local application. Deploying the database server may include defining the configuration settings of the database server that will run the provisioned application. The next step in the orchestration flow performed by the provisioning system 1770 may include configuring and deploying the middleware of the local application. For example, the middleware of the local application may be defined based on configurations provided by the user. Next, the defined middleware is connected with one or more cloud servers of the cloud system 1750. The orchestration flow moves on to the next step where the Elasticsearch server is configured based on the defined middleware. The provisioning system 1770 may perform the steps of the orchestration flow to provision the local application onto cloud servers of the cloud system 1750.

It will be appreciated that after the local application is provisioned, the application environment may need to be updated over time (e.g., patches, bug fixes, new features, etc.) For example, there may be changes to the provisioned application and database binaries through database updates in terms of changes to tablespaces and data stored in the database. The updated application may be a new and updated version of the application environment when compared to the provisioned application that was previously deployed. The cloud system 1750 can facilitate creating a new template from the updated version of the application environment (e.g., by performing the "clone-to-template" feature).

It will be appreciated that provisioning the application on cloud system 1750 may include encapsulating the deployment package the local application needed to be deployed on the cloud. For example, defining the topology for the application environment may include specifying the distribution of nodes that run the database server, the application server, and the web server (e.g., whether the database server is run on a single node, the application server is run on a different node, and the web server is run on another node, or whether the database server, the application server, and the web server are each run on a single node). Defining the topology for the local application may also include specifying the RAM, the CPU, and the type of disk used to provision the local application on cloud system 1750.

It will also be appreciated that once the local application is provisioned, users may make customizations to the provisioned application (e.g., change the data for the user's needs). The cloud manager application allows users to perform a process called "templatization," in which the cloud manager application captures the current topology of the provisioned application and the changes that were made to the application, including changes to the database server, the binary files, and customizations. The cloud manager clones the current topology with the updates and stores the cloned application as a new deployment package to be stored in the repository. Each new template is labeled as a version of the local application. Advantageously, developers can access individual templates and make further modifications to the individual templates for different uses (e.g., developers may make modifications to a template so that the application can be used in a training environment, developers may make modifications to another template so that the application can be used in a production environment, and so on). Each new template is stored in the repository as a version of the application. When modifications are made to a template, the modified template is serialized and stored as a deployment package in the repository.

Figure 18:
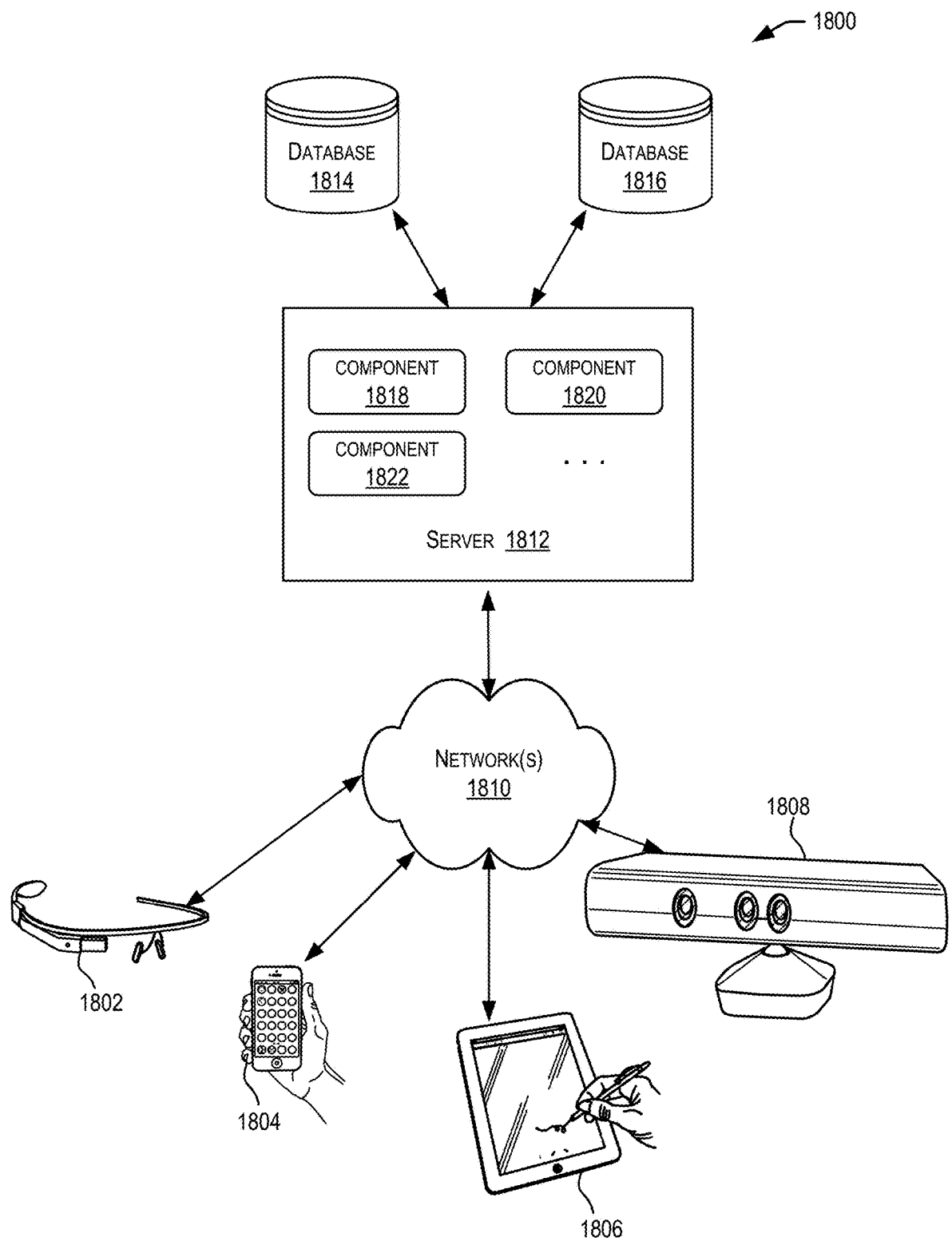
FIG. 18 is a simplified diagram illustrating a distributed system for implementing one of the embodiments.

FIG. 18 depicts a simplified diagram of a distributed system 1800 for implementing one of the embodiments. In the illustrated embodiment, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various embodiments, server 1812 may be adapted to run one or more services or software applications provided by one or more of the components of the system. In some embodiments, these services may be offered as web-based or cloud services or under a Software as a Service (SaaS) model to the users of client computing devices 1802, 1804, 1806, and/or 1808. Users operating client-computing devices 1802, 1804, 1806, and/or 1808 may in turn utilize one or more client applications to interact with server 1812 to utilize the services provided by these components.

In the configuration depicted in the figure, the software components 1818, 1820 and 1822 of system 1800 are shown as being implemented on server 1812. In other embodiments, one or more of the components of system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The embodiment shown in the figure is thus one example of a distributed system for implementing an embodiment system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), systems network architecture (SNA), Internet packet exchange (IPX), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1812 may be adapted to run one or more services or software applications described in the foregoing disclosure. For example, server 1812 may correspond to a server for performing processing described above according to an embodiment of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of embodiments, databases 1814 and 1816 may reside in a storage-area network (SAN). Similarly, any necessary files for performing the functions attributed to server 1812 may be stored locally on server 1812 and/or remotely, as appropriate. In one set of embodiments, databases 1814 and 1816 may include relational databases, such as databases provided by Oracle, that are adapted to store, update, and retrieve data in response to SQL-formatted commands.

Figure 19:
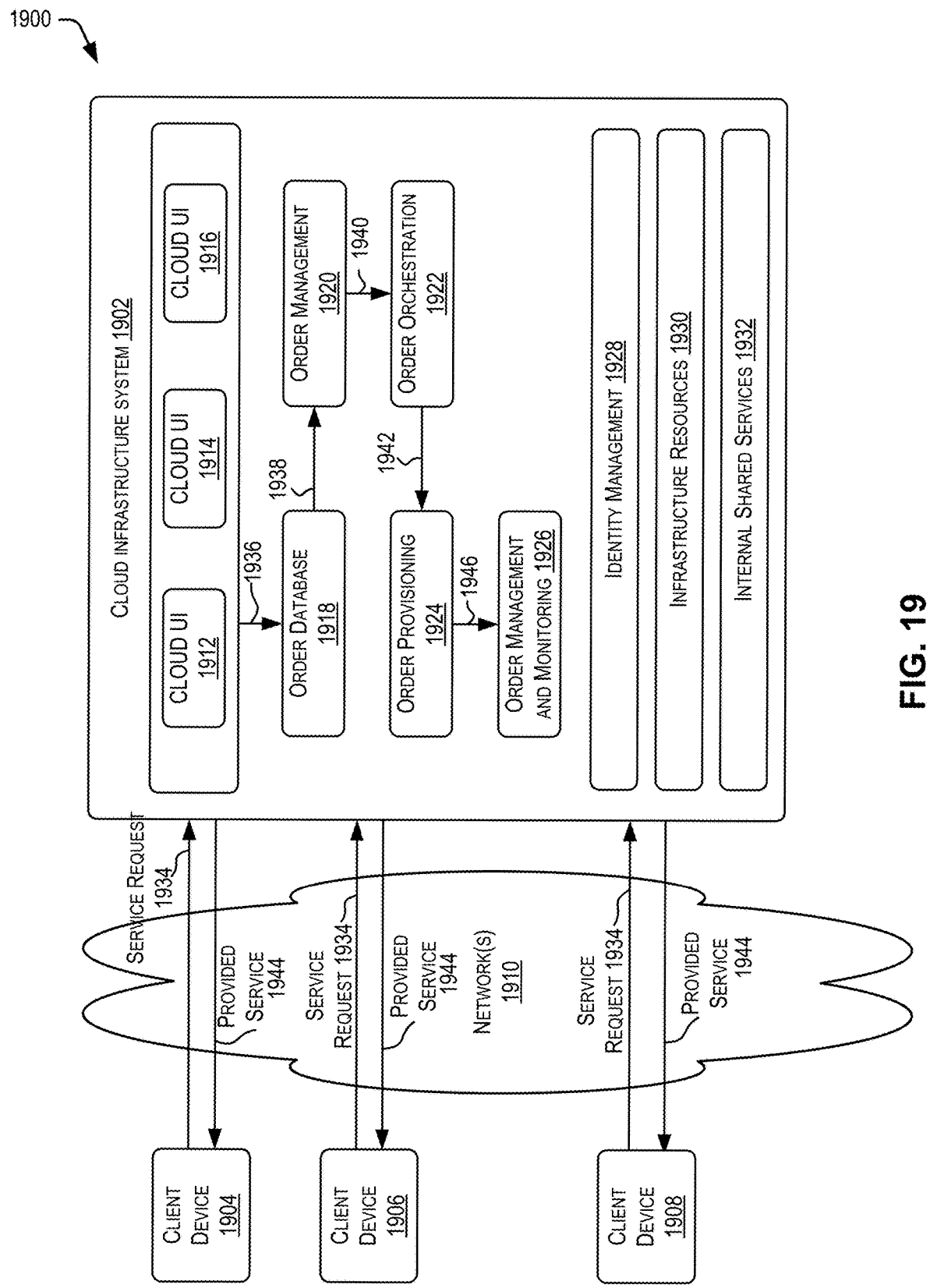
FIG. 19 is a simplified block diagram illustrating one or more components of a system environment.

FIG. 19 is a simplified block diagram of one or more components of a system environment 1900 by which services provided by one or more components of an embodiment system may be offered as cloud services, in accordance with an embodiment of the present disclosure. In the illustrated embodiment, system environment 1900 includes one or more client computing devices 1904, 1906, and 1908 that may be used by users to interact with a cloud infrastructure system 1902 that provides cloud services. The client computing devices may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902.

It should be appreciated that cloud infrastructure system 1902 depicted in the figure may have other components than those depicted. Further, the embodiment shown in the figure is only one example of a cloud infrastructure system that may incorporate an embodiment of the disclosure. In some other embodiments, cloud infrastructure system 1902 may have more or fewer components than shown in the figure, may combine two or more components, or may have a different configuration or arrangement of components.

Client computing devices 1904, 1906, and 1908 may be devices similar to those described above for 1802, 1804, 1806, and 1808 as shown in FIG. 18.

Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between clients 1904, 1906, and 1908 and cloud infrastructure system 1902. Each network may be any type of network familiar to those skilled in the art that can support data communications using any of a variety of commercially available protocols, including those described above for network(s) 1810.

Cloud infrastructure system 1902 may comprise one or more computers and/or servers that may include those described above for server 1812 as shown in FIG. 18.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1902 may be adapted to automatically provision, manage and track a customer's subscription to services offered by cloud infrastructure system 1902. Cloud infrastructure system 1902 may provide the cloud services via different deployment models. For example, services may be provided under a public cloud model in which cloud infrastructure system 1902 is owned by an organization selling cloud services (e.g., owned by Oracle) and the services are made available to the general public or different industry enterprises. As another example, services may be provided under a private cloud model in which cloud infrastructure system 1902 is operated solely for a single organization and may provide services for one or more entities within the organization. The cloud services may also be provided under a community cloud model in which cloud infrastructure system 1902 and the services provided by cloud infrastructure system 1902 are shared by several organizations in a related community. The cloud services may also be provided under a hybrid cloud model, which is a combination of two or more different models.

In some embodiments, the services provided by cloud infrastructure system 1930 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1902 then performs processing to provide the services in the customer's subscription order.

In some embodiments, the services provided by cloud infrastructure system 1902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1902 may also include infrastructure resources 1930 for providing the resources used to provide various services to customers of the cloud infrastructure system. In one embodiment, infrastructure resources 1930 may include pre-integrated and optimized combinations of hardware, such as servers, storage, and networking resources to execute the services provided by the PaaS platform and the SaaS platform.

In some embodiments, resources in cloud infrastructure system 1902 may be shared by multiple users and dynamically re-allocated per demand. Additionally, resources may be allocated to users in different time zones. For example, cloud infrastructure system 1930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1932 may be provided that are shared by different components or modules of cloud infrastructure system 1902 and by the services provided by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 1902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1902, and the like.

In one embodiment, as depicted in the figure, cloud management functionality may be provided by one or more modules, such as an order management module 1920, an order orchestration module 1922, an order-provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In exemplary operation 1934, a customer using a client device, such as client device 1904, 1906 or 1908, may interact with cloud infrastructure system 1902 by requesting one or more services provided by cloud infrastructure system 1902 and placing an order for a subscription for one or more services offered by cloud infrastructure system 1902. In certain embodiments, the customer may access a cloud User Interface (UI), cloud UI 1912, cloud UI 1914 and/or cloud UI 1916 and place a subscription order via these UIs. The order information received by cloud infrastructure system 1902 in response to the customer placing an order may include information identifying the customer and one or more services offered by the cloud infrastructure system 1902 that the customer intends to subscribe to.

After an order has been placed by the customer, the order information is received via the cloud UIs, 1912, 1914 and/or 1916.

At operation 1936, the order is stored in order database 1918. Order database 1918 can be one of several databases operated by cloud infrastructure system and operated in conjunction with other system elements.

At operation 1938, the order information is forwarded to an order management module 1920. In some instances, order management module 1920 may be configured to perform billing and accounting functions related to the order, such as verifying the order, and upon verification, booking the order.

At operation 1940, information regarding the order is communicated to an order orchestration module 1922. Order orchestration module 1922 may utilize the order information to orchestrate the provisioning of services and resources for the order placed by the customer. In some instances, order orchestration module 1922 may orchestrate the provisioning of resources to support the subscribed services using the services of order provisioning module 1924.

In certain embodiments, order orchestration module 1922 enables the management of processes associated with each order and applies logic to determine whether an order should proceed to provisioning. At operation 1942, upon receiving an order for a new subscription, order orchestration module 1922 sends a request to order provisioning module 1924 to allocate resources and configure those resources needed to fulfill the subscription order. Order provisioning module 1924 enables the allocation of resources for the services ordered by the customer. Order provisioning module 1924 provides a level of abstraction between the cloud services provided by cloud infrastructure system 1900 and the physical implementation layer that is used to provision the resources for providing the requested services. Order orchestration module 1922 may thus be isolated from implementation details, such as whether or not services and resources are actually provisioned on the fly or pre-provisioned and only allocated/assigned upon request.

At operation 1944, once the services and resources are provisioned, a notification of the provided service may be sent to customers on client devices 1904, 1906, and/or 1908 by order provisioning module 1924 of cloud infrastructure system 1902.

At operation 1946, the customer's subscription order may be managed and tracked by an order management and monitoring module 1926. In some instances, order management and monitoring module 1926 may be configured to collect usage statistics for the services in the subscription order, such as the amount of storage used, the amount data transferred, the number of users, and the amount of system up time and system down time.

In certain embodiments, cloud infrastructure system 1900 may include an identity management module 1928. Identity management module 1928 may be configured to provide identity services, such as access management and authorization services in cloud infrastructure system 1900. In some embodiments, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.) Identity management module 1928 may also include the management of descriptive information about each customer and about how and by whom that descriptive information can be accessed and modified.

Figure 20:
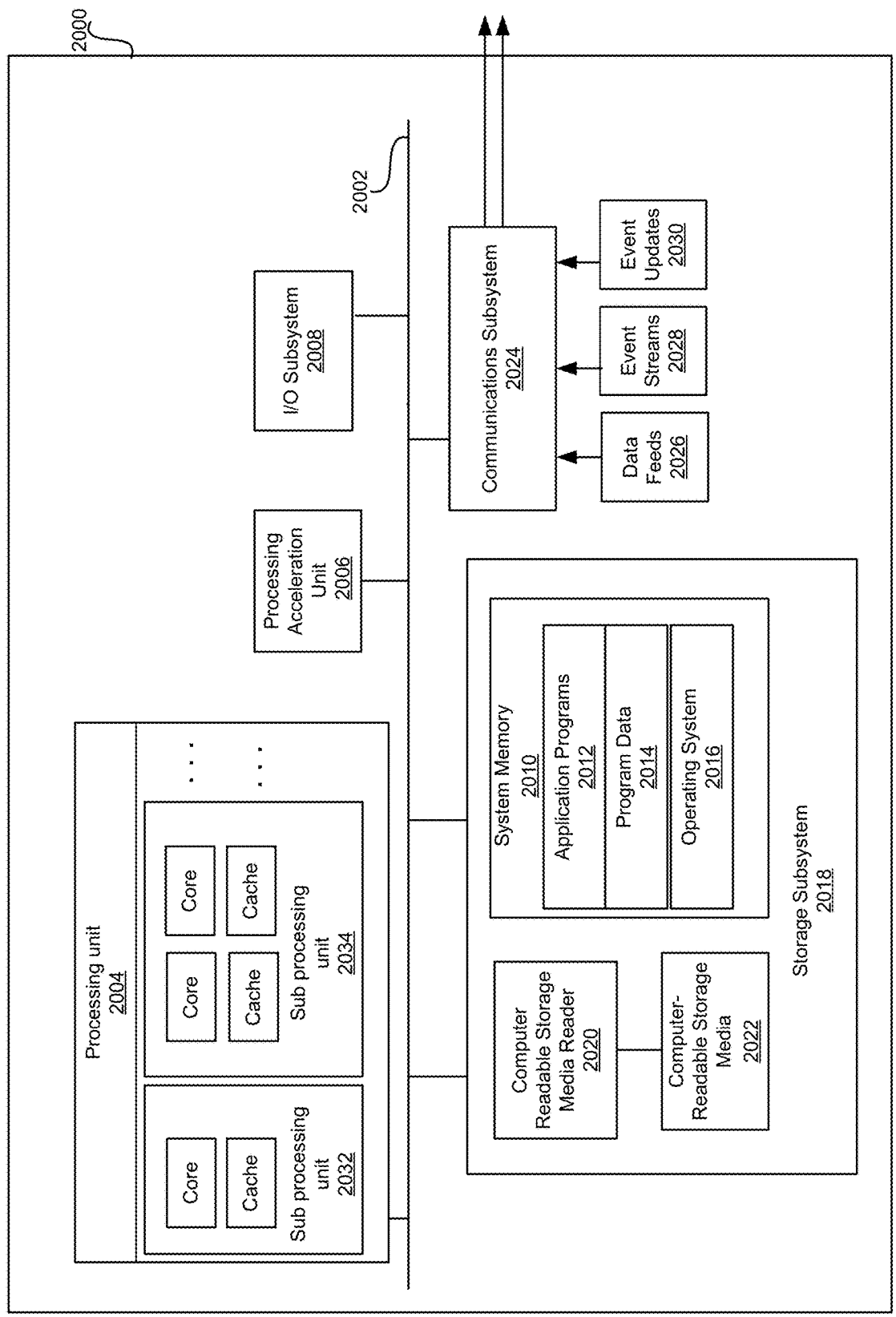
FIG. 20 illustrates an exemplary computer system, in which various embodiments of the present disclosure may be implemented.

FIG. 20 illustrates an exemplary computer system 2000, in which various embodiments of the present disclosure may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an input/output (I/O) subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processing unit 2004 and/or in storage subsystem 2018. Through suitable programming, processing unit 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as musical instrument digital interface (MIDI) keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2018 may also provide a tangible computer-readable storage medium for storing the basic programming and data constructs that provide the functionality of some embodiments. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present disclosure.

Storage subsystem 2018 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc-read-only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2000.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 1202.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030 that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for generating a graphical user interface to enter search criteria to generate search results, the method comprising:
   receiving a first user input, the first user input providing an indication for a search of stored data;
   generating a list of search criteria;
   receiving a first selection of one or more search criteria from the list of search criteria;
   generating a selected search criteria interface to be displayed on a display of a computing device, the selected search criteria interface comprising a first search criterion box listing a first criterion from the first selection of the one or more search criteria;
   generating a second search criterion box listing a second criterion of the first selection of the one or more search criteria, wherein the first search criterion box and the second search criterion box are presented vertically or horizontally within a limited display area, wherein the selected search criteria interface is configured to reorder the first search criterion box and the second search criterion box via a drag and drop user input;
   generating a graphical Boolean switch between and connecting the first search criterion box and the second search criterion box in the selected search criteria interface;
   selecting a logic operator for the graphical Boolean switch, where the graphical Boolean switch is configured to change a logic operator via a single tap on the graphical Boolean switch;
   receiving a second user input for setting the graphical Boolean switch;
   generating a first logical expression for a search based at least in part on the selected search criteria, the selected logic operator, and positions of a plurality of graphical Boolean switches between the selected search criteria; and
   generating a search result of the stored data based at least in part on the first logical expression.

2. The method of claim 1, further comprising:
   generating secondary search criteria for each of the one or more search criteria listed on the graphical user interface;
   receiving a third user input, the third user input comprising one or more secondary search criteria;
   generating a third graphical user interface configured to receive a fourth user input to select one or more options for the one or more secondary search criteria;
   receiving the fourth user input, the fourth user input selecting the one or more options for the one or more secondary search criteria;
   generating a second logical expression for the search based at least in part on the selected search criteria, the positions of the plurality of the graphical Boolean switches between the selected search criteria, and the selected options for the one or more secondary search criteria; and generating a second search result of the stored data based at least in part on the second logical expression.

3. The method of claim 2, wherein one of the one or more options for the secondary search criteria includes a mandatory toggle switch, the mandatory toggle switch indicates whether the search criteria is required to be listed in the stored data presented in the search result.

4. The method of claim 2, wherein one of the one or more options for the secondary search criteria includes a value indicating an importance of the search criteria to be listed in the search result.

5. The method of claim 2, wherein one of the one or more options for the secondary search criteria includes a value indicating a proficiency of the search criteria to be listed in the search result.

6. The method of claim 1, further comprising:
receiving a fifth user input selecting one of the selected search criteria;
dragging the one of the selected search criteria on the graphical user interface from a first position to a second position; and
receiving a sixth selection to change one of the graphical Boolean switches;
generating a third logical expression for a search based at least in part on the selected search criteria and the positions of the plurality of graphical Boolean switches between the selected search criteria; and
generating a third search result of the stored data based at least in part on the third logical expression.

7. The method of claim 1, wherein the graphical user interface presents the selected search criteria interface in either a horizontal format or a vertical format, wherein the horizontal format and the vertical format are with respect to a display screen.

8. A computing system, comprising:
one or more memories; and
one or more processors communicatively coupled to the one or more memories, configured to perform operations for generating a graphical user interface to generate search results, the operations comprising:
receive a first user input, the first user input providing an indication for a search of stored data;
generate a list of search criteria;
receive a first selection of one or more search criteria from the list of search criteria;
generate a selected search criteria interface to be displayed on a display of a computing device, the selected search criteria interface comprising a first search criterion box listing a first criterion from the first selection of the one or more search criteria;
generating a second search criterion box listing a second criterion of the first selection of the one or more search criteria, wherein the first search criterion box and the second search criterion box are presented vertically or horizontally within the display of the computing device within a limited display area, wherein the selected search criteria interface is configured to reorder the first search criterion box and the second search criterion box via a drag and drop user input;
generate a graphical Boolean switch between and connecting the first search criterion box and the second search criterion box in the selected search criteria interface;
select a logic operator for the graphic Boolean switch, where the graphical Boolean switch is configured to change a logic operator via a single tap on the graphical Boolean switch;
receive a second user input for setting the graphical Boolean switch;
generate a first logical expression for a search based at least in part on the selected search criteria, the selected logic operator, and positions of a plurality of graphical Boolean switches between the selected search criteria; and
generate a search result of the stored data based at least in part on the first logical expression.

9. The computing system of claim 8, wherein the one or more processors are further configured to:
generate secondary search criteria for each of the one or more search criteria listed on the graphical user interface;
receive a third user input, the third user input comprising one or more secondary search criteria;
generate a third graphical user interface configured to receive a fourth user input to select one or more options for the one or more secondary search criteria;
receive the fourth user input, the fourth user input selecting the one or more options for the one or more secondary search criteria;
generate a second logical expression for the search based at least in part on the selected search criteria, the positions of the plurality of the graphical Boolean switches between the selected search criteria, and the selected options for the one or more secondary search criteria; and
generate a second search result of the stored data based at least in part on the second logical expression.

10. The computing system of claim 9, wherein one of the one or more options for the secondary search criteria includes a mandatory toggle switch, the mandatory toggle switch indicates whether the search criteria is required to be listed in the stored data presented in the search result.

11. The computing system of claim 9, wherein one of the one or more options for the secondary search criteria includes a value indicating an importance of the search criteria to be listed in the search result.

12. The computing system of claim 9, wherein one of the one or more options for the secondary search criteria includes a value indicating a proficiency of the search criteria to be listed in the search result.

13. The computing system of claim 8, wherein the one or more processors are further configured to:
receive a fifth user input selecting one of the selected search criteria;
drag the one of the selected search criteria on the graphical user interface from a first position to a second position; and
receive a sixth selection to change the graphical Boolean switch;
generate a third logical expression for a search based at least in part on the selected search criteria and the positions of the plurality of graphical Boolean switches between the selected search criteria; and
generate a third search result of the stored data based at least in part on the third logical expression.

14. The computing system of claim 8, wherein the graphical user interface presents the selected search criteria interface in either a horizontal format or a vertical format, wherein the horizontal format and the vertical format are with respect to a display screen.

15. A non-transitory computer-readable medium storing instructions, the instructions comprising:

one or more instructions that, when executed by one or more processors, cause the one or more processors to perform operations for generating a graphical user interface to enter search criteria to generate search results, the operations comprising:

receive a first user input, the first user input providing an indication for a search of stored data;

generate a list of search criteria;

receive a first selection of one or more search criteria from the list of search criteria;

generate a selected search criteria interface to be displayed on a display of a computing device, the selected search criteria interface comprising a first search criterion box listing a first criterion from the first selection of the one or more search criteria;

generating a second search criterion box listing a second criterion of the first selection of the one or more search criteria, wherein the first search criterion box and the second search criterion box are presented vertically or horizontally within the display of the computing device within a limited display area, wherein the selected search criteria interface is configured to reorder the first search criterion box and the second search criterion box via a drag and drop user input;

generate a graphical Boolean switch between and connecting the first search criterion box and the second search criterion box in the selected search criteria interface;

select a logic operator for the graphic Boolean switch, where the graphical Boolean switch is configured to change a logic operator via a single tap on the graphical Boolean switch;

receive a second user input for setting the graphical Boolean switch;

generate a first logical expression for a search based at least in part on the selected search criteria, the selected logic operator, and positions of a plurality of graphical Boolean switches between the selected search criteria; and generate a search result of the stored data based at least in part on the first logical expression.

16. The non-transitory computer-readable medium of claim 15, wherein the one or more instructions, when executed by the one or more processors, further cause the one or more processors to:

generate secondary search criteria for each of the one or more search criteria listed on the graphical user interface;

receive a third user input, the third user input comprising one or more secondary search criteria;

generate a third graphical user interface configured to receive a fourth user input to select one or more options for the one or more secondary search criteria;

receive the fourth user input, the fourth user input selecting the one or more options for the one or more secondary search criteria;

generate a second logical expression for the search based at least in part on the selected search criteria, the positions of the plurality of the graphical Boolean switches between the selected search criteria, and the selected options for the one or more secondary search criteria; and generate a second search result of the stored data based at least in part on the second logical expression.

17. The non-transitory computer-readable medium of claim 16, wherein one of the one or more options for the secondary search criteria includes a mandatory toggle switch, the mandatory toggle switch indicates whether the search criteria is required to be listed in the stored data presented in the search result.

18. The non-transitory computer-readable medium of claim 16, wherein one of the one or more options for the secondary search criteria includes a value indicating an importance of the search criteria to be listed in the search result.

19. The non-transitory computer-readable medium of claim 16, wherein one of the one or more options for the secondary search criteria includes a value indicating a proficiency of the search criteria to be listed in the search result.

20. The non-transitory computer-readable medium of claim 15, wherein the one or more instructions, when executed by the one or more processors, further cause the one or more processors to:

receive a fifth user input selecting one of the selected search criteria;

drag the one of the selected search criteria on the graphical user interface from a first position to a second position; and receive a sixth selection to change the graphical Boolean switch;

generate a third logical expression for a search based at least in part on the selected search criteria and the positions of the plurality of graphical Boolean switches between the selected search criteria; and generate a third search result of the stored data based at least in part on the third logical expression.

* * * * *

UNITED STATES PATENT AND TRADEMARK OFFICE
CERTIFICATE OF CORRECTION

| | |
|---|---|
| PATENT NO. | : 11,461,314 B2 |
| APPLICATION NO. | : 17/097872 |
| DATED | : October 4, 2022 |
| INVENTOR(S) | : Debajyoti Mitra |

It is certified that error appears in the above-identified patent and that said Letters Patent is hereby corrected as shown below:

On the Title Page

On page 2, Column 1, item (56) under Other Publications, Line 11, delete "Syncfustion," and insert -- Syncfusion, --, therefor.

In the Specification

In Column 1, Line 13, delete "search.to" and insert -- search to --, therefor.

In Column 2, Line 59, delete "interface, The" and insert -- interface. The --, therefor.

In Column 6, Line 59, delete "range." and insert -- range). --, therefor.

In Column 7, Lines 2-3, delete "A user can begin selection of criteria by selecting the".

In Column 7, Line 66, delete "criterial" and insert -- criteria --, therefor.

In Column 11, Line 1, delete "employment" and insert -- Employment --, therefor.

In Column 29, Line 12, delete "evolution)," and insert -- evolution)), --, therefor.

Signed and Sealed this
Fourth Day of April, 2023

Katherine Kelly Vidal
*Director of the United States Patent and Trademark Office*